United States Patent
Chen et al.

(10) Patent No.: US 11,405,481 B2
(45) Date of Patent: Aug. 2, 2022

(54) SYSTEM AND METHODS FOR SERVICE LAYER CACHE MANAGEMENT

(71) Applicant: CONVIDA WIRELESS, LLC, Wilmington, DE (US)

(72) Inventors: Zhuo Chen, Claymont, DE (US); Dale N. Seed, Allentown, PA (US); Michael F. Starsinic, Newtown, PA (US); William Robert Flynn, IV, Schwenksville, PA (US); Rocco Di Girolamo, Laval (CA); Quang Ly, North Wales, PA (US); Shamim Akbar Rahman, Cote St. Luc (CA); Gregory S. Sternberg, Mt. Laurel, NJ (US); Catalina Mihaela Mladin, Hatboro, PA (US); Yogendra C. Shah, Exton, PA (US); Vinod Kumar Choyi, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 5 days.

(21) Appl. No.: 16/309,164

(22) PCT Filed: Jun. 13, 2017

(86) PCT No.: PCT/US2017/037202
§ 371 (c)(1),
(2) Date: Dec. 12, 2018

(87) PCT Pub. No.: WO2017/218503
PCT Pub. Date: Dec. 21, 2017

(65) Prior Publication Data
US 2019/0132412 A1 May 2, 2019

Related U.S. Application Data

(60) Provisional application No. 62/349,205, filed on Jun. 13, 2016.

(51) Int. Cl.
*H04L 29/08* (2006.01)
*H04L 67/568* (2022.01)
(Continued)

(52) U.S. Cl.
CPC ...... *H04L 67/2842* (2013.01); *G06F 21/6272* (2013.01); *H04L 67/16* (2013.01); *H04W 4/70* (2018.02)

(58) Field of Classification Search
CPC ..... H04L 29/08; H04L 67/2842; H04L 67/16; G06F 21/62; H04W 4/70
(Continued)

(56) References Cited

U.S. PATENT DOCUMENTS

| | | | |
|---|---|---|---|
| 2014/0237067 A1* | 8/2014 | Todd | H04L 67/1031 709/213 |
| 2015/0029894 A1* | 1/2015 | Lu | H04M 15/61 370/259 |
| 2015/0055557 A1* | 2/2015 | Dong | H04W 72/048 370/328 |

FOREIGN PATENT DOCUMENTS

| | | |
|---|---|---|
| KR | 2014-0101086 A | 8/2014 |
| WO | 2013/142139 A2 | 9/2013 |

OTHER PUBLICATIONS

ETSI TS 102 690 V2.0.14 Technical Specification, "Machine-to-Machine Communications (M2M) Functional Architecture", Jul. 2013, 332 pages.
(Continued)

*Primary Examiner* — Sibte H Bukhari
(74) *Attorney, Agent, or Firm* — BakerHostetler

(57) ABSTRACT

A caching entity may store a cached copy of a service layer resource. An original hosting entity may maintain a registry of the corresponding cached resources. Optionally, the original hosting entity may set cache parameters to govern the lifetime of the cache on a caching entity. The caching entity
(Continued)

may keep storing the cached copy of the resource and the original hosting entity may obtain statistics about the cached resource. By knowing the statistics, e.g. how many times a resource is retrieved on each caching entity, the original hosting entity may better manage the resource.

12 Claims, 35 Drawing Sheets

(51) Int. Cl.
 *G06F 21/62* (2013.01)
 *H04W 4/70* (2018.01)
 *H04L 67/51* (2022.01)
(58) Field of Classification Search
 USPC .......................................................... 709/213
 See application file for complete search history.

(56) References Cited

OTHER PUBLICATIONS

Fielding et al., Network Working Group RFC: 2616, "Hypertext Transfer Protocol—HTTP/1.1", Jun. 1999, 114 pages.

OneM2M Technical Specification TS-0001 V1.6.1, "Functional Architecture", Jan. 2015, 321 pages.

Shelby et al., CoRE Internet Draft, "CoRE Resource Directory draft-Shelby-core-resource-directory-05", Feb. 2013, 27 pages.

Shelby et al., Internet Engineering Task Force (IETF) RFC: 7252, "The Constrained Application Protocol (CoAP)", Jun. 2014, 112 pages.

Vial, et al., CoRE Internet-Draft, "CoRE Mirror Server draft-vial-core-mirror-proxy-01", Jul. 2012, 19 pages.

* cited by examiner

| <container> | | | |
|---|---|---|---|
| n | "common attribute" | → | Common attributes |
| 1 | creator | → | AE-ID or CSE-ID of the creator |
| 0..1 | maxNrOfInstances | → | Maximum number of <contentInstance> child resources |
| 0..1 | maxByteSize | → | Maximum number of bytes allocated for the <container> resource |
| 0..1 | maxInstanceAge | → | Maximum age of <contentInstance> in seconds |
| 1 | currentNrOfInstances | → | Current number of <contentInstance> in a <container> resource. Limited by *maxNrOfInstances* |
| 1 | currentByteSize | → | Current size in bytes of data stored in total in <container> resource. Limited by *maxByteSize* |
| 0..1 | locationID | → | ID of the resource where the attributes/policies that define how location information are obtained and managed. |
| 0..1 | ontologyRef | → | A reference (URI) of the ontology used to represent the data stored in the <container> resource |

FIG. 5

SYSTEM AND METHODS FOR SERVICE LAYER CACHE MANAGEMENT

CROSS-REFERENCE TO RELATED APPLICATIONS

This application is the National Stage Application of International Patent Application No. PCT/US2017/037202 filed Jun. 13, 2017 which claims the benefit of U.S. Provisional Patent Application Ser. No. 62/349,205, filed Jun. 13, 2016, the disclosures of which are hereby incorporated herein by reference as if set forth in their entireties.

BACKGROUND

A Machine-to-Machine (M2M)/Internet of Things (IoT) Service Layer (SL) is a technology specifically targeted towards providing value-added services for M2M/IoT devices and applications. Recently, several industry standard bodies (e.g., one M2M [one M2M-TS-0001, one M2M Functional Architecture-V-1.6.1] and European Telecommunications Standards Institute (ETSI) [ETSI TS 102 690 Machine-to-Machine communications (M2M) Functional architecture V2.0.13]) have been developing M2M/IoT SLs to address the challenges associated with the integration of M2M/IoT devices and applications into deployments with the Internet/Web, cellular, enterprise, and home network.

An M2M/IoT SL can provide applications and devices access to a collection of M2M/IoT oriented capabilities. A few examples include security, charging, data management, device management, discovery, provisioning, and connectivity management. These capabilities are made available to applications via Application Programming Interfaces (APIs) which make use of message formats, resource structures and resource representations supported by the M2M/IoT SL.

From a protocol stack perspective, SLs are typically situated above the Application Protocol Layer and provide value added services to applications they support. Hence SLs are often categorized as 'middleware' services. FIG. 1 shows an exemplary service layer 102 between the Application Protocols 106 and Applications 104.

one M2M has defined a M2M/IoT SL. The one M2M service layer can provide "horizontal" services that can be utilized by different "vertical" M2M systems and applications, such as e-Health, fleet management, and smart homes. The architecture of the one M2M SL, as shown in FIG. 2, defines a Common Service Entity (CSE) 202 that supports four reference points. The Mca reference point interfaces with the Application Entity (AE) 204. The Mcc reference point interfaces with another CSE 206 within the same service provider domain and the Mcc' reference point interfaces with another CSE in a different service provider domain. The Mcn reference point interfaces with the underlying network service entity (NSE) 208. A NSE 208 provides underlying network services to the CSEs, such as device management, location services and device triggering. A CSE 202 contains multiple logical functions called "Common Service Functions (CSFs)", such as "Discovery", "Data Management & Repository". FIG. 3 illustrates the CSFs supported by oneM2M.

As shown in FIG. 4, the oneM2M architecture enables a number of nodes including Application Service Node (ASN) 402, Application Dedicated Node (ADN) 404, Middle Node (MN) 406, Infrastructure Node (IN) 408, and a Non-one M2M Node (NoDN) 410.

An ASN 402 is a Node that contains one CSE and contains at least one Application Entity (AE). As one example of a physical mapping, an ASN 402 could reside in an M2M Device.

An ADN 404 is a Node that contains at least one AE and does not contain a CSE. As one example of physical mapping, an Application Dedicated Node 404 could reside in a constrained M2M Device.

A MN 406 is a Node that contains one CSE and contains zero or more AEs. As one example of physical mapping, a MN 406 could reside in an M2M Gateway.

An IN 408 is a Node that contains one CSE and contains zero or more AEs. A CSE in an IN 408 may contain CSE functions not applicable to other node types. As one example of physical mapping, an IN 408 could reside in an M2M Service Infrastructure.

A non-one M2M Node 410 is a Node that does not contain oneM2M Entities (neither AEs nor CSEs). Such Nodes represent devices attached to the oneM2M system for inter-working purposes, including management.

The possible configurations of inter-connecting the various entities supported within the oneM2M system are illustrated in FIG. 4.

In oneM2M, an entity any create a <container> resource as a place to store data as shown in FIG. 5 and in FIG. 6. The actual data content is stored in the <contentInstance> child.

oneM2M defines an announced resource scheme to facilitate the resource discovery. As shown in FIG. 7, after sensor 702 creates a resource at the M2M Gateway 704, sensor 702 may request the M2M Gateway 704 to announce the information to the M2M server 706 and 708. Thus, other entities can discover the announced resource at M2M Server 706 and 708. In particular, the sensor 706 sends a request to create two entries associated with M2M Server 706 and 708 in the announceTo attribute at the original resource on M2M Gateway 704. The M2M Gateway 704 then sends a request to M2M Server 706 and 708 to create an announced resource. The announced resource has a subset of attributes of the original resource with the same value. For example, the expiration time of the announced resource is the same as the original resource. The M2M Server 706 or 708 does not have the access right to edit the announced resource it stores. For example, the M2M Server 706 or 708 cannot modify or delete an announced resource it stores. For example, if the resource on M2M Gateway 704 is changed, the M2M Gateway 704 will send an update request to M2M Server 706 and 708 to update the announced resource as shown in FIG. 8.

A caching strategy can decrease latency and improve throughput by taking load off back-end servers and databases. Caching has been applied to the Internet. Two main mechanisms are web caching and Content Delivery Networks. A web cache temporarily stores or caches web documents passing through it, such as HTML pages and images, to reduce bandwidth usage, server load, etc. Subsequent requests may be satisfied from the cache if certain conditions are met. Content Delivery Networks (CDNs) intend to increase Internet capacity by replicating content files to caches (i.e. surrogate servers) close to end users. The surrogate servers cache a set of content files and deliver them on behalf of the origins to decrease the traffic going through the origin servers as well as to decrease the overall network traffic. Typically, the surrogate servers are located at the edge of the network close to the end users. A content provider can sign up with a CDN provider, and nearby end users can then retrieve the content files from the surrogate server in a transparent fashion.

Currently in M2M system, caching is mainly supported at the Application Protocol Layer. HTTP and CoAP are two major Application Protocol Layer protocols used in M2M systems. The following illustrates the caching mechanisms supported in HTTP and CoAP.

HTTP [Hypertext Transfer Protocol—HTTP/1.1, RFC 2616] supports caching so that content can be stored by the browser locally or a proxy which sits somewhere between the client and the origin server, and reused when required. Some types of data such as stock prices and weather forecasts are frequently changed and it is important that the browser does not display stale versions of these resources. By carefully controlling caching, it is possible to reuse static content and prevent the storage of dynamic data.

HTTP defines three basic mechanisms for controlling caches: freshness, validation, and invalidation.

Freshness allows a response to be used without re-checking it on the origin server. HTTP provides two ways for servers to specify the freshness lifetime of a response: the Expires header and the max-age cache control directive. The Expires header's value is the date and time when a response becomes stale. The max-age cache control directive specifies the number of seconds that the response should be considered fresh.

Validation can be used to check whether a cached response is still good after it becomes stale. A cache can make a conditional request using the If-Modified-Since header to see if it has changed. Another kind of validator provided by HTTP/1.1 is known as an entity tag (ETag). An entity tag is an opaque string used to identify a specific instance of an object. A cache uses an ETag to validate its object with the If-None-Match request header.

Invalidation is usually a side effect of another request that passes through the cache. If a URL associated with a cached response later gets a POST, PUT or DELETE request, the cached response will be invalidated.

In HTTP, a cache decides if a particular response is cacheable by looking at different components of the request and the response. Specifically, it examines the following:
  The response status code
  The request method
  Response Cache-control directives
  A response validator
  Request authentication These different factors interact in a somewhat complicated manner; details can be found in the Hypertext Transfer Protocol—HTTP/1.1, RFC 2616.

CoAP [Constrained Application Protocol (CoAP), IETF RFC 7252] supports the caching of responses in order to efficiently fulfill requests. Simple caching is enabled using freshness and validity information carried with CoAP responses. A cache could be located in an end-point or an intermediary.

CoAP defines a more simplified freshness model, validation model and invalidation model than HTTP.
  Freshness model: The Max-Age Option indicates that the response is to be considered not fresh after its age is greater than the specified number of seconds.
  Validation model: An end-point can use the ETag Option in the GET request to give the origin server an opportunity to both select a stored response to be used, and to update its freshness.
  Invalidation model: A cache should mark any stored response for a created, deleted and changed resource as not fresh.

Unlike HTTP, the cacheability of CoAP responses does not depend on the request method, but instead depends on the response code. Details can be found in Constrained Application Protocol (CoAP), IETF RFC 7252. Moreover, to support sleeping device, an entity named Resource Directory (RD) is introduced to host descriptions of resources held on other servers [draft-ietf-core-resource-directory-05, "CoRE Resource Directory"]. This allows an entity to look up those resources via a RD. A sleeping device can also store resource representations in an entity called Mirror. This allows an entity to retrieve those resources via a Mirror Server.

SUMMARY

A good caching strategy can decrease latency by huge percentages, and improves throughput by taking load off expensive back-end servers and databases. Currently in M2M systems, caching is mainly supported at the Application Protocol Layer. Caching at the Service Layer may be able to provide complete access control and subscription features for a cached resource, and Service Layer caching may be employed by entities outside of a provider's network and may not require a CDN provider. However, current Service Layer (SL) implementations lack capabilities to manage cached resources.

Two methods are described herein for the creation of SL cached resources:
  1) A method initiated by a Caching Entity to create a cached copy of the resource.
  2) A method initiated by an Original Hosting Entity to create cached copies of the resource at Caching Entities.

By using the described methods, a Caching Entity can store a cached copy of a SL resource while the Original Hosting Entity can maintain a registry of the corresponding cached resources. Optionally, the Original Hosting Entity can set cache parameters to govern the lifetime of the cache on a Caching Entity.

Additionally, two methods are described for M2M/IoT SL technologies to refresh a cached resource:
  1) A method initiated by a Caching Entity to refresh the cached copy of the resource.
  2) A method initiated by an Original Hosting Entity to refresh the cached copies of the resource.

By using the described methods, a Caching Entity can keep storing the cached copy of the resource and the Original Hosting Entity can obtain statistics about the cached resource. By knowing the statistics information, e.g. how many times a resource is retrieved on each Caching Entity, the Original Hosting CSE can better manage the resource. For example, the Original Hosting CSE may control how many times the resource can be accessed by a user. In another example, the Original Hosting CSE may charge fee to the user based on how many times the resources are accessed.

Also, a method is described for an Original Hosting Entity to update cached copies stored on Caching Entities when the original resource is updated. By using the method, the original resource and the cache copies of the resource are synchronized.

Still further, two methods are described for the deletion of cached copies of a resource:
  1) A method initiated by a Caching Entity to delete the cached copy of the resource.
  2) A method initiated by an Original Hosting Entity to delete the cached copies of the resource.

By using these methods, a Caching Entity may delete the cached copy of a resource.

The Service Layer cache management mechanisms described herein may be embodied in a oneM2M Service Layer implementation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 5 is a diagram that illustrates attributes of container resource in one M2M

DETAILED DESCRIPTION OF ILLUSTRATIVE EMBODIMENTS

Disclosed herein are mechanisms for managing cached resources at a service layer of a communications network, such as an M2M communications network. The following abbreviations may be used throughout the following description:
ACP Access Control Policy
ADN Application Dedicated Node
AE Application Entity
API Application Programming Interfaces
ASN Application Service Node
CDN Content Delivery Network
CSE Common Service Entity
CSF Common Service Function
FQDN Fully Qualified Domain Name
IoT Internet of Things
IP Internet Protocol
M2M Machine to Machine
MN Middle Node
NoDN Non-oneM2M Node
NSE Network Service Entity
SCL Service Capability Layer
SL Service Layer
URL Uniform Resource Locator The following terms may have the following general meanings:

"Cacheability" may be considered to be an attribute associated with a resource to indicate whether the resource is allowed to be cached at a Caching Entity. The attribute has two values, one is Cacheable and the other one is non-Cacheable.

"Cacheable" may be the value of the Cacheability that indicates the original resource is allowed to be cached at a Caching Entity.

A "Caching Entity" may be an SL Entity that stores a copy of a resource representation hosted at another SL entity.

An "M2M/IoT Service layer (SL)" may be a software middleware layer that supports value-added services for M2M/IoT applications and devices through a set of Application Programming Interfaces (APIs) and underlying networking interfaces.

An "M2M/IoT application" may be an application targeting a particular M2M/IoT use case (e.g. eHealth, smart energy, home automation).

"Non-Cacheable" may be a value of the Cacheability that indicates the original resource is not allowed to be cached at a Caching Entity.

An "Original Hosting Entity" may be an SL Entity that hosts the original resource "SL Caching" may be ae process by which an SL Entity stores a copy of the resource representation hosted at another SL entity.

A "SL Entity" may be an M2M Device, M2M Gateway, or a device in the M2M Area Network or the M2M Application Layer or M2M Service Layer software components A "SL Resource" may be a uniquely addressable entity in M2M/IoT SL.

Figure 1:
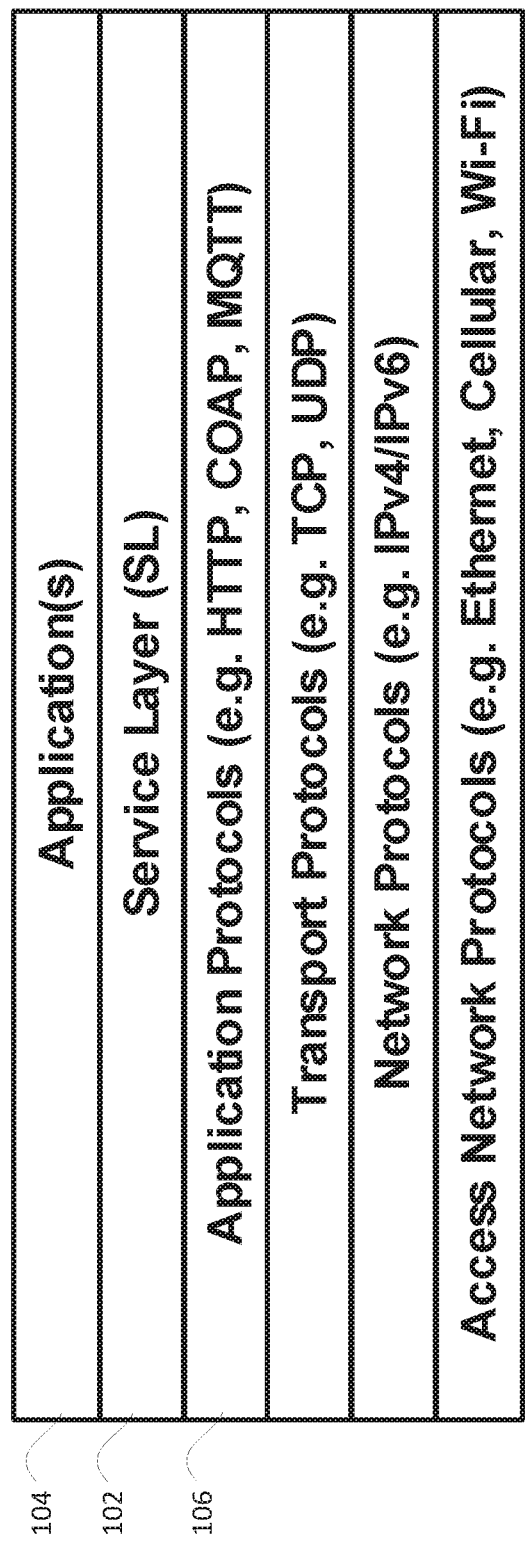
FIG. 1 is a diagram that illustrates an exemplary protocol stack supporting a service layer
Figure 2:
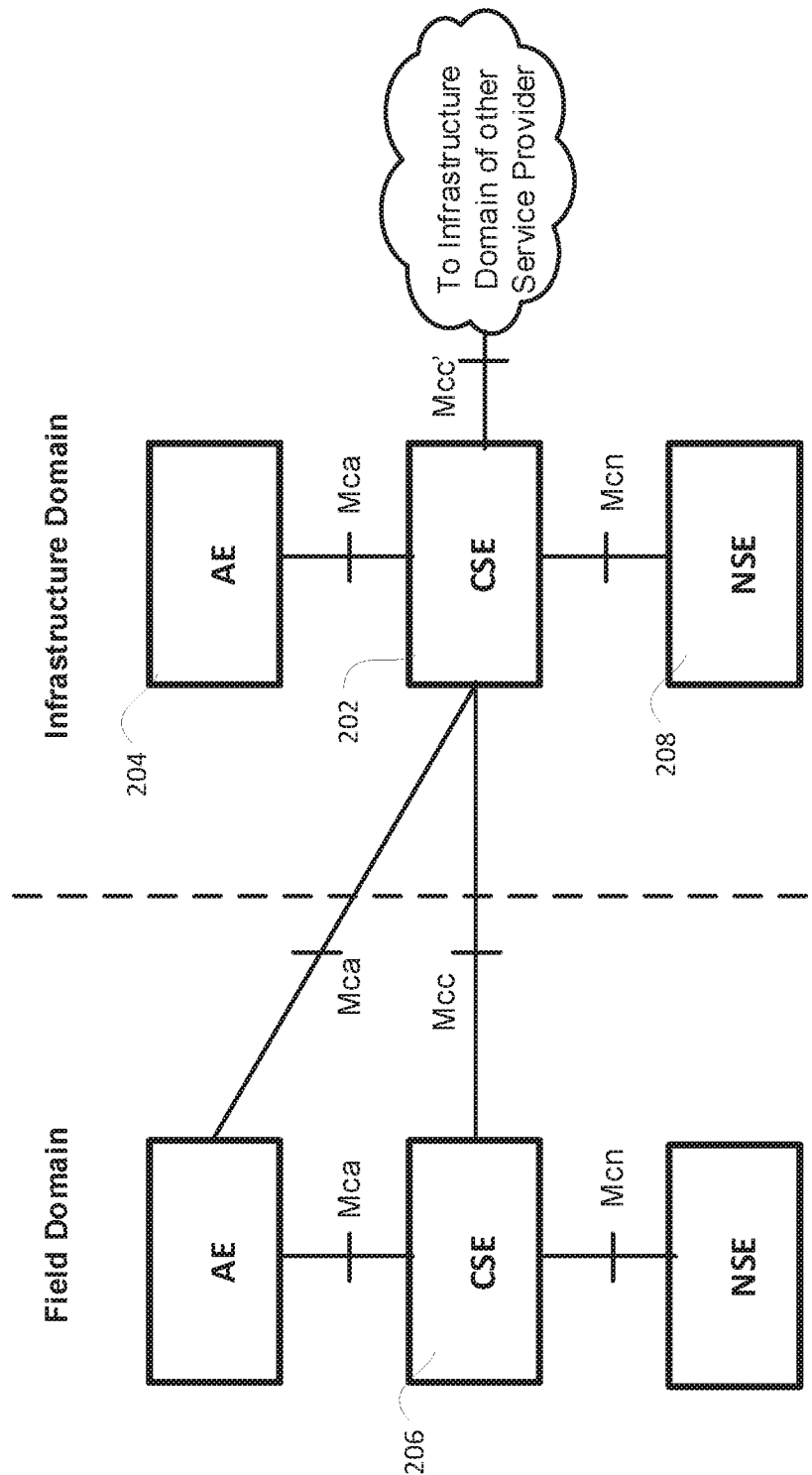
FIG. 2 is a diagram that illustrates a one M2M architecture
Figure 3:
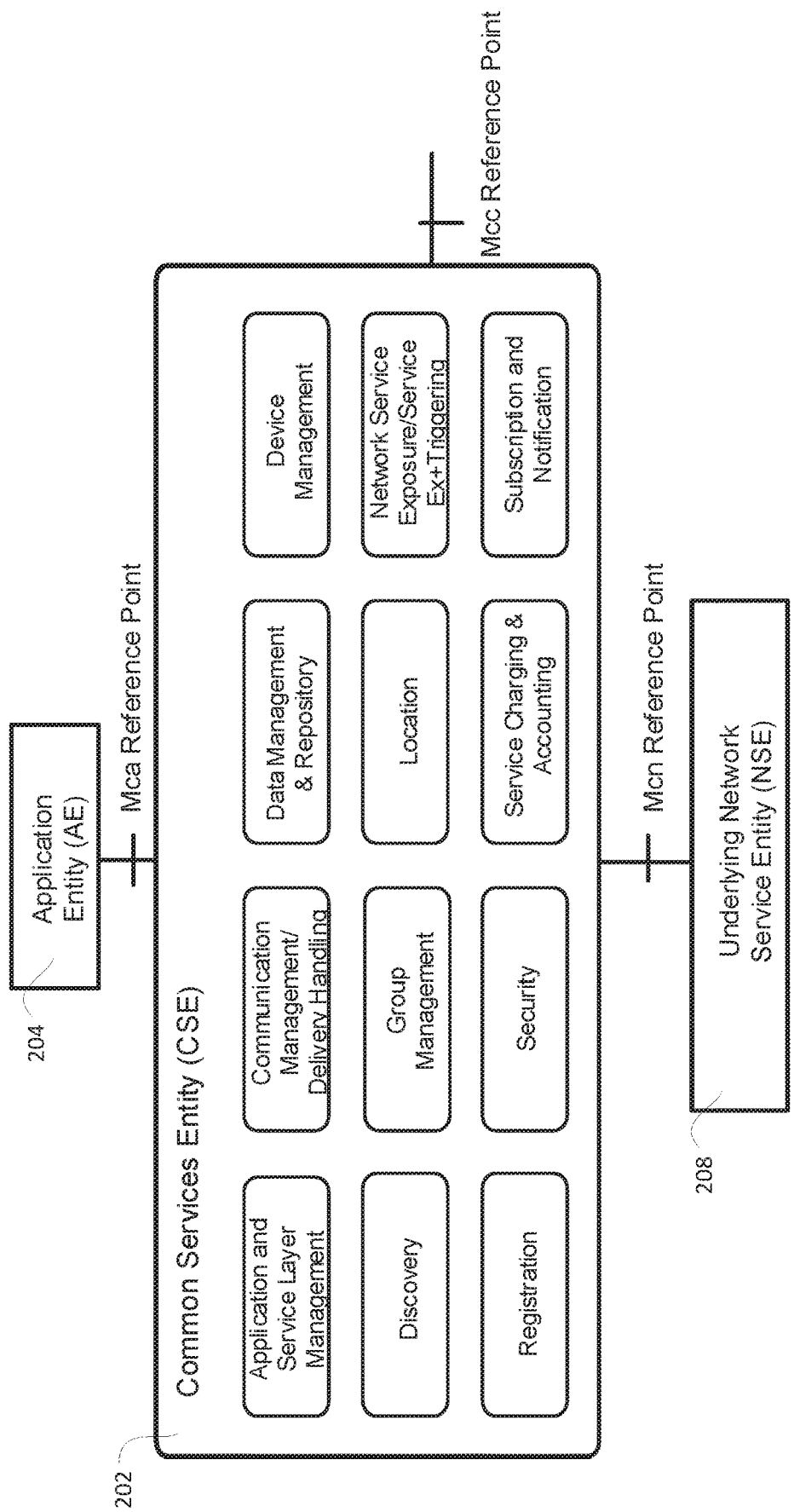
FIG. 3 is a diagram that illustrates a one M2M Common Service Functions
Figure 4:
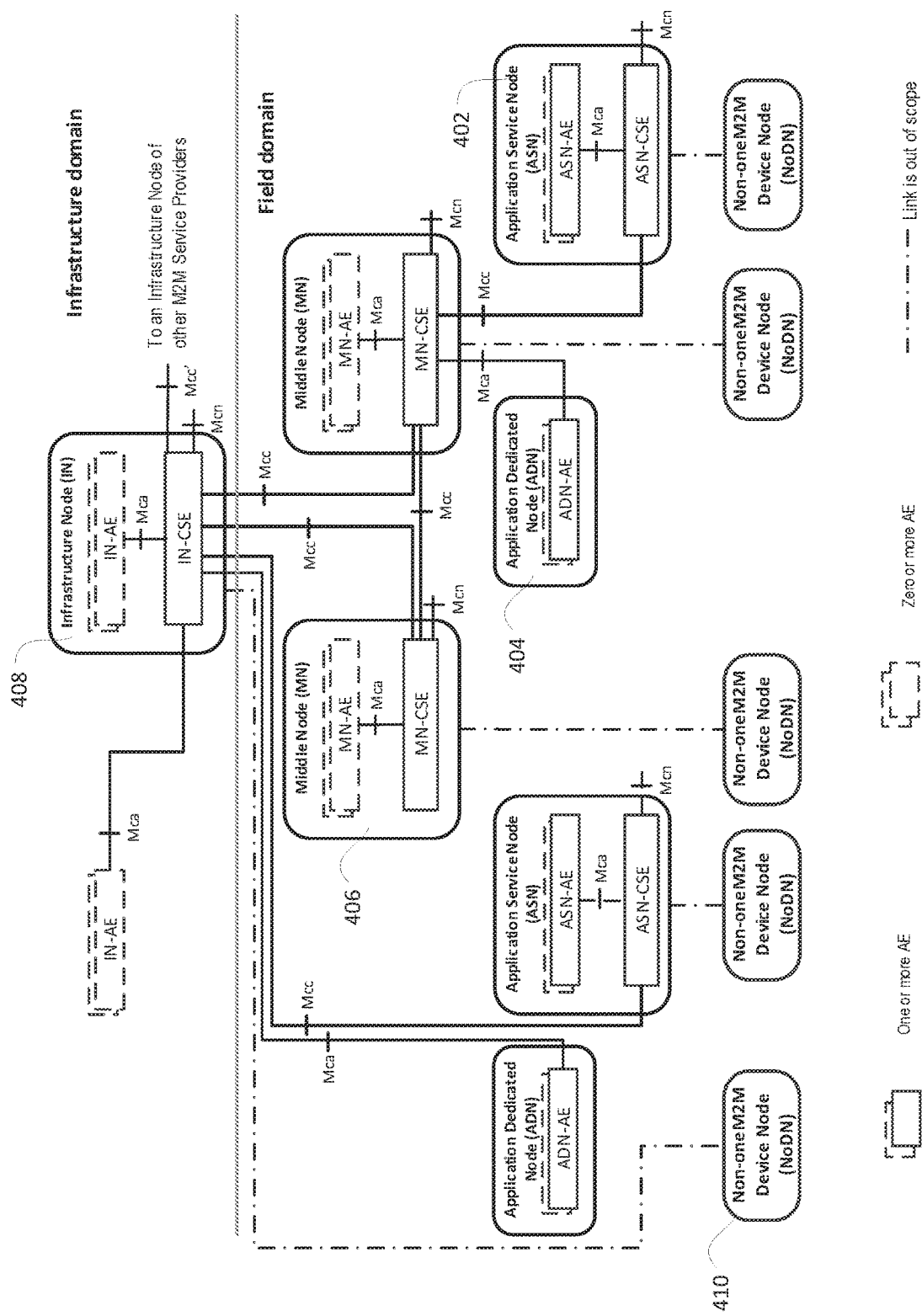
FIG. 4 is a diagram that illustrates configurations supported by one M2M Architecture
Figure 6:
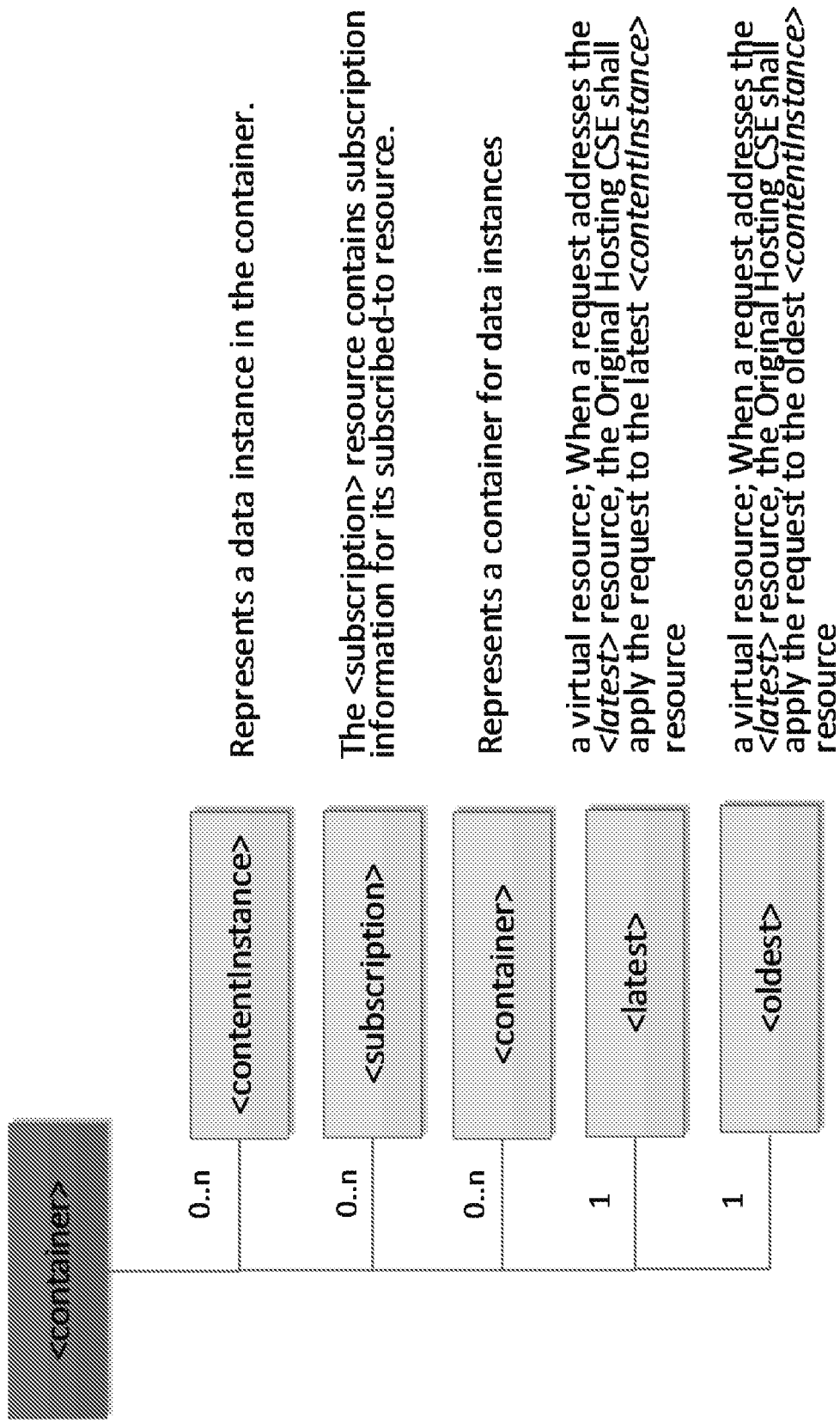
FIG. 6 is a diagram that illustrates child resources of container resource in oneM2M
Figure 7:
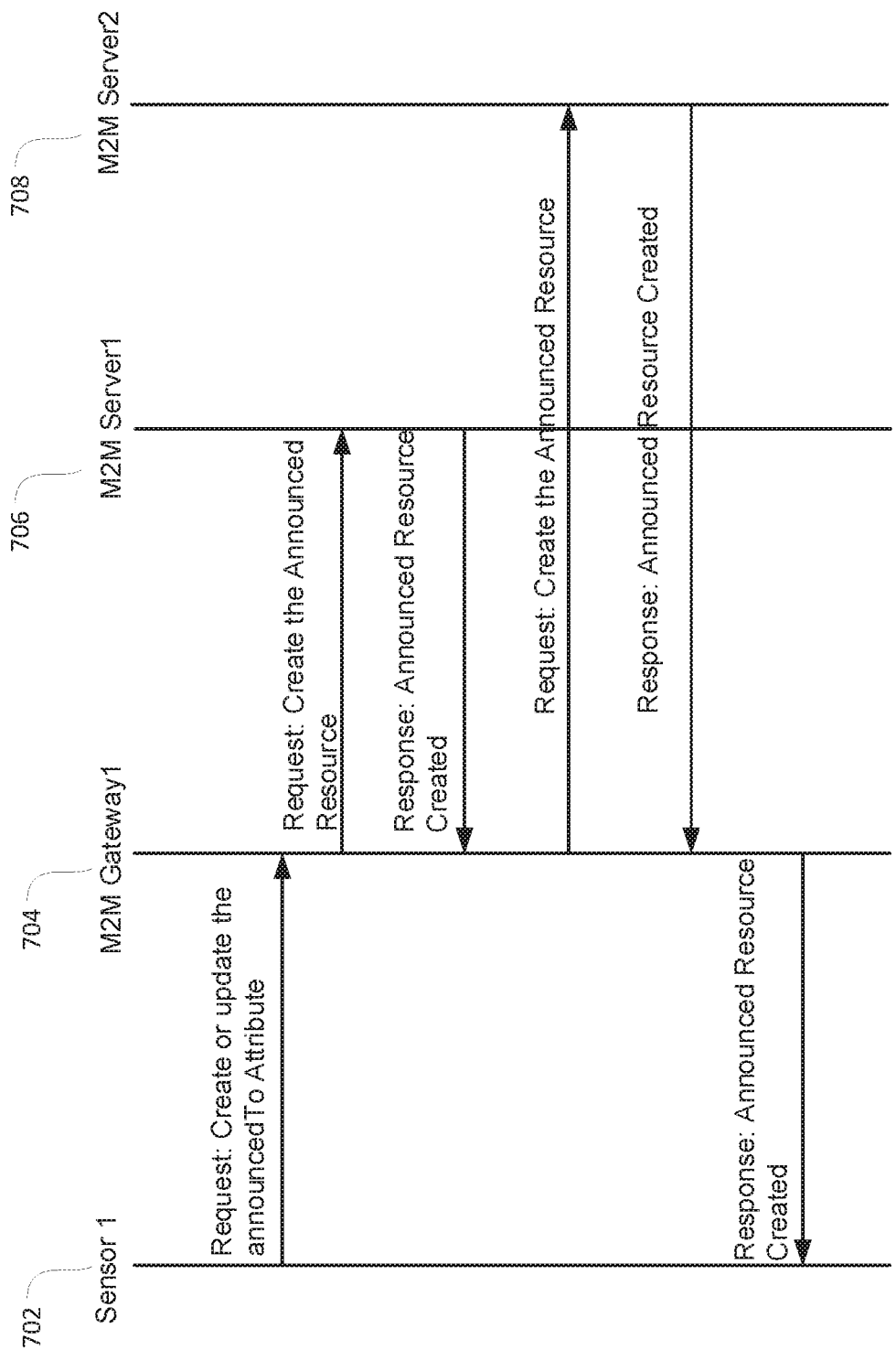
FIG. 7 is a flow chart that illustrates an announced resource creation in oneM2M architecture
Figure 8:
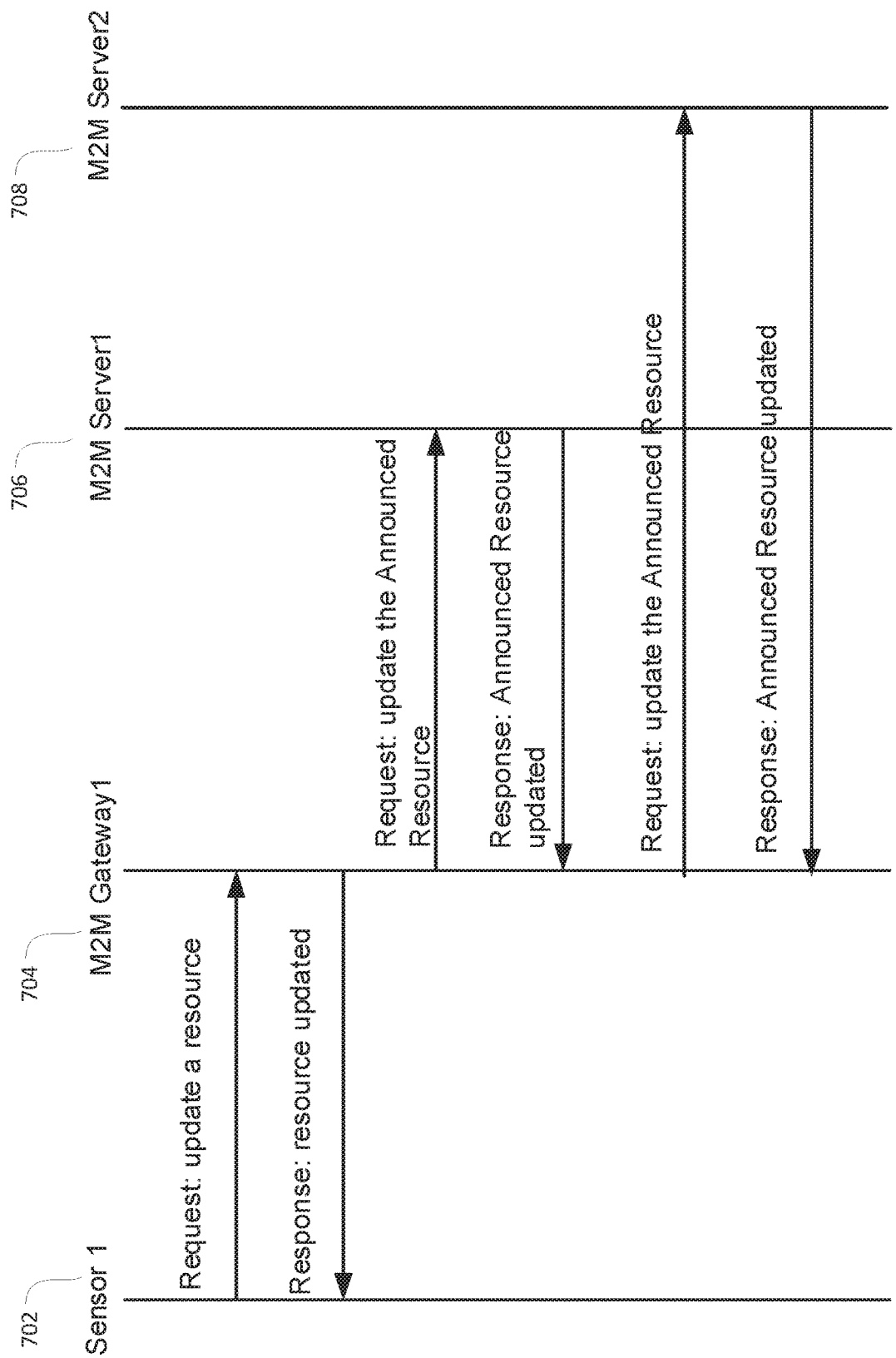
FIG. 8 is a flow chart that illustrates an announced resource synchronization in oneM2M architecture
Figure 9:
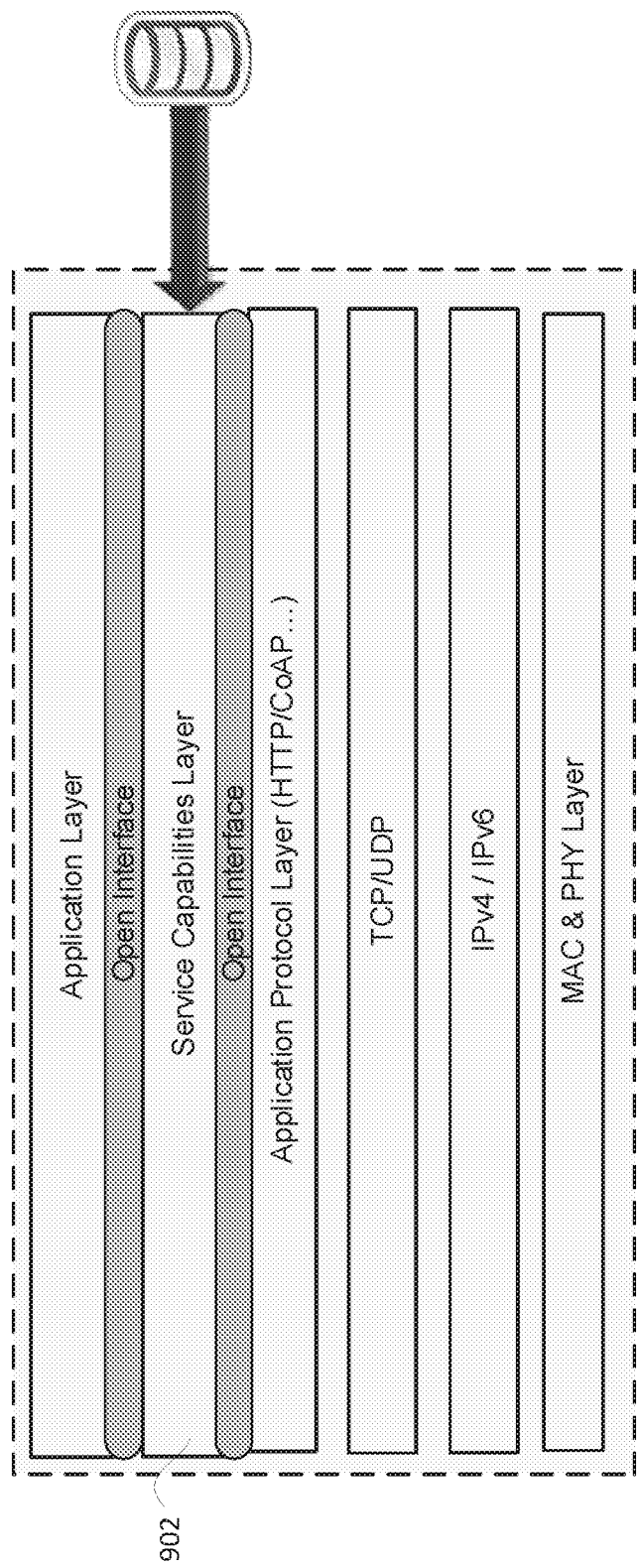
FIG. 9 is a diagram that illustrates service capabilities layer caching

Caching at the Service Layer has been proposed in the ETSI M2M architecture. The caching supported at the Service Capabilities Layer (SCL) 902 is illustrated in FIG. 9. The caches can be at the SCL 902, and the SCL 902 can be in charge of managing all the cached resources in the caches.

The Service Capabilities Layer caching is able to provide complete access control and subscription features of the cached resource, which are not supported by the caching scheme in application layer protocols such as HTTP and CoAP. Service Layer caching can be employed for entities outside of the provider's network and do not require a CDN provider.

There are many M2M/IoT use cases where service layer caching can be used to improve the performance of service layer communications.

Figure 10:
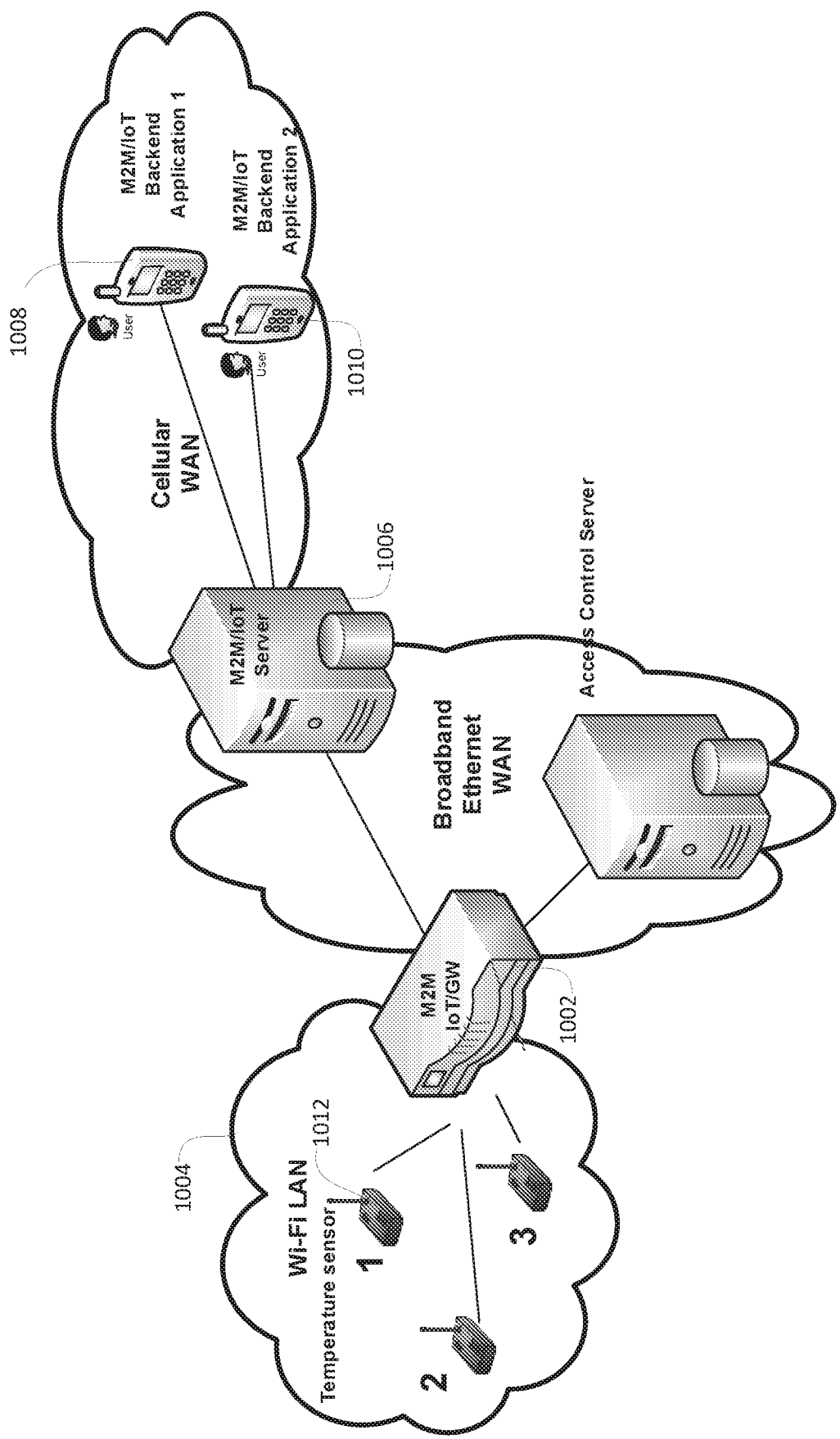
FIG. 10 is a diagram that illustrates multiple applications that retrieve the same resource from a M2M Gateway via a common M2M Server.
Figure 11:
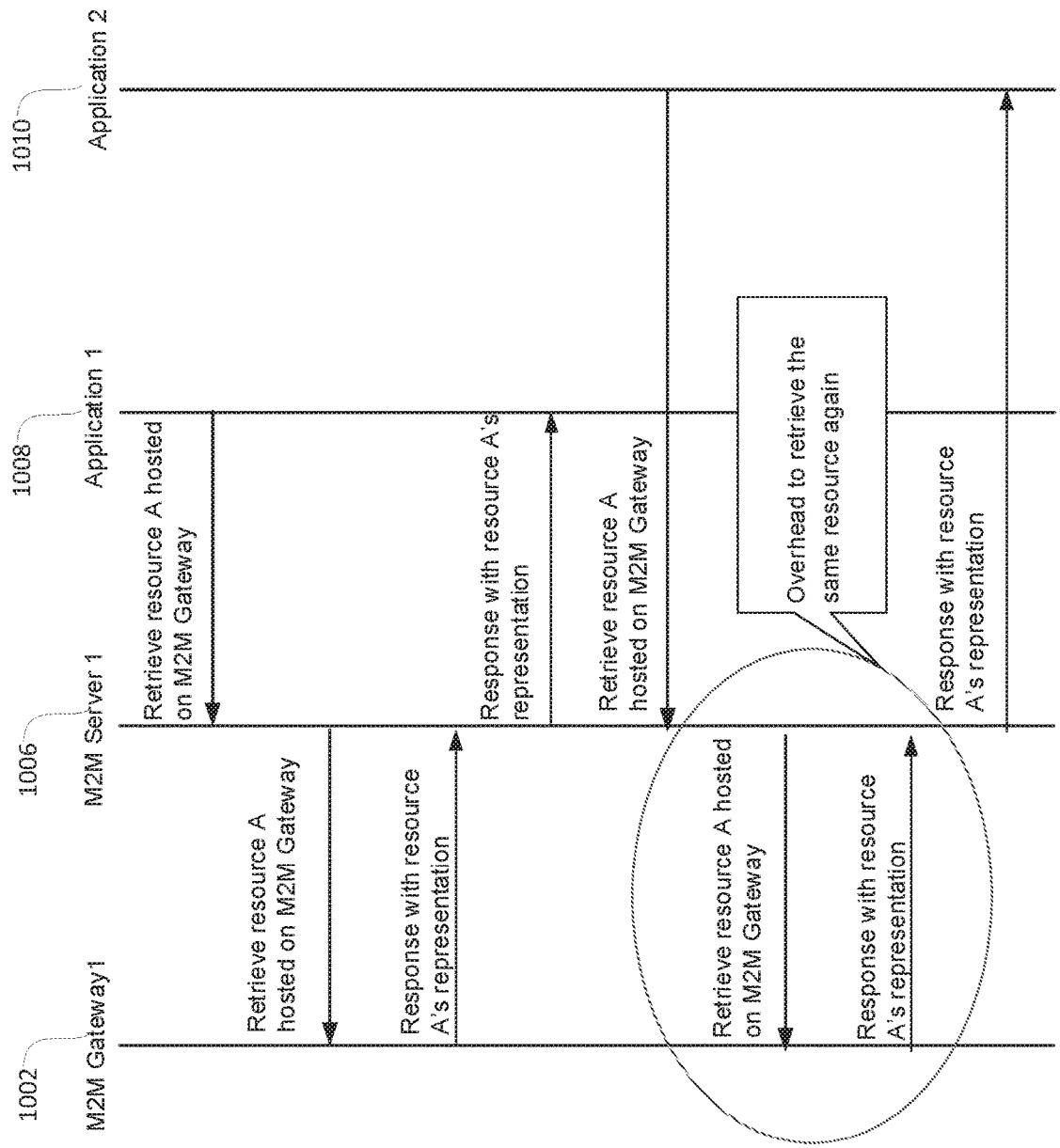
FIG. 11 is a flow chart that illustrates two applications that access resource hosted on a M2M Gateway via a common M2M Server

As illustrated in FIG. 10, temperature sensors (e.g., sensor 1012) in an apartment complex periodically report the temperature to an M2M Gateway 1002 via Wi-Fi LAN 1004. Multiple residents (User 1 and User 2) register to a M2M server 1006 and monitor the temperature readings using an application hosted on a device, such as a phone 1008, 1010. When the M2M Server 1006 receives a request from a user to retrieve a temperature reading on the M2M Gateway 1002, the M2M server 1006 forwards the request to the M2M Gateway 1002 that hosts the temperature reading resources, as shown in FIG. 11. The messages between the M2M Server 1006 and the M2M Gateway 1002 can result in a lot of overhead involving repeated requests to retrieve the same resource. To reduce the overhead introduced by the messages, the M2M Server 1006 can create a local cached copy of the temperature reading resource at the service layer with the same access control policy as the original resource hosted at the M2M Gateway 1002. When the M2M Server 1006 receives a request, it can use the local cached copy of the resource to serve the request instead of forwarding the request to the M2M Gateway 1002. The local cached copy of the resource must be synchronized with the original version stored on the M2M Gateway 1002. In other words, when the content of the resource on the M2M Gateway 1002 is changed, all its cached copies stored on the M2M Server 1002 should be updated or deleted.

Current M2M/IoT SL technologies lack methods to manage the cached copies of resources hosted by Service Layer entities. For existing SL technologies, when an entity creates a cached copy of a SL resource representation, it does not interact with the entity that hosts the original resource. For example, as described in the use case, after the M2M Server receives a response from the M2M Gateway 1002, it creates a cached copy of the resource without letting the M2M Gateway 1002 know of this cached copy. Thus, the SL entity in the system that hosts the original resource, e.g. M2M Gateway 1002, is not aware that a cached copy of the resource has been created. This can introduce the following types of problems.

Figure 12:
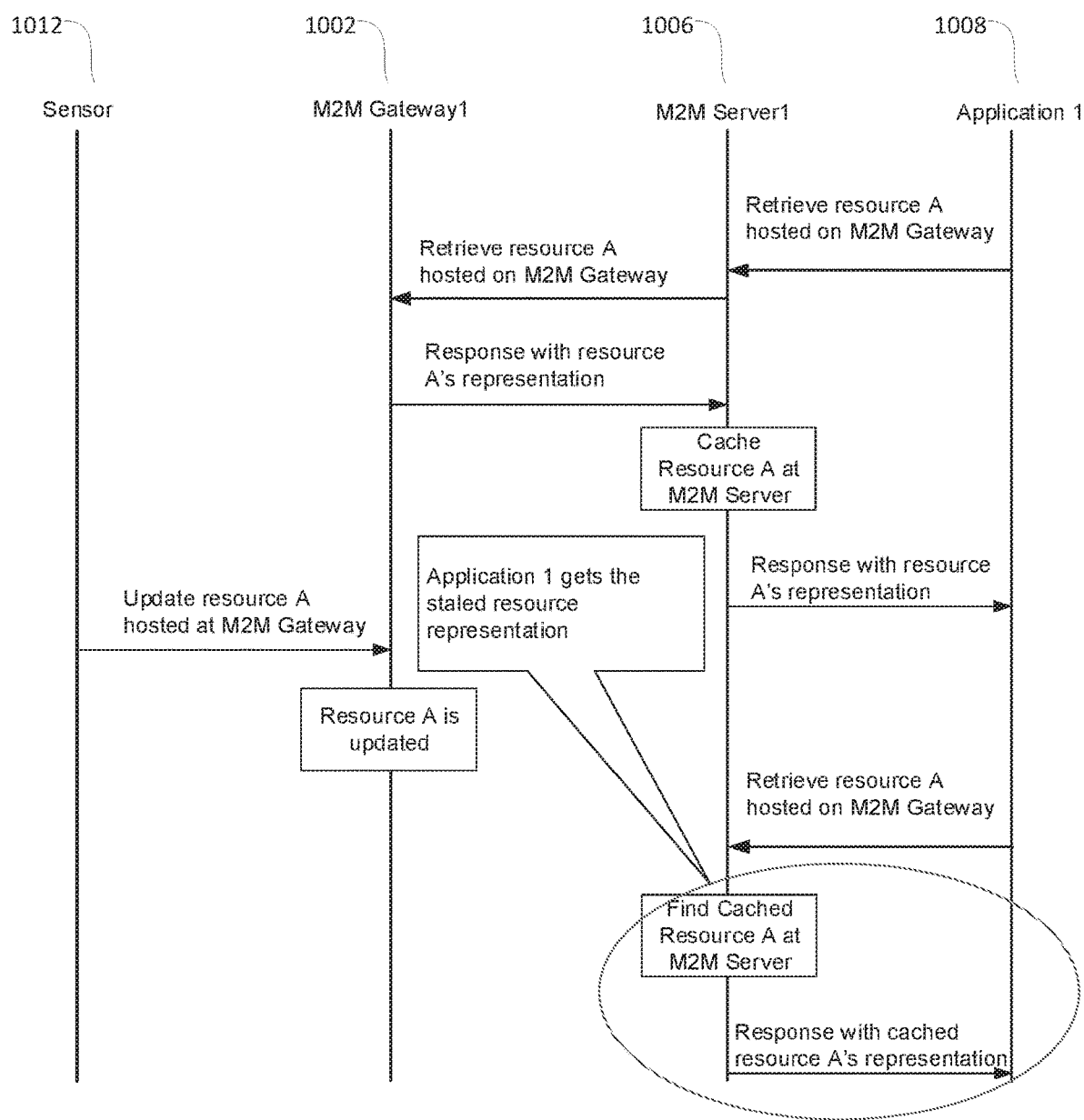
FIG. 12 is a flow chart that illustrates a M2M server that creates a cached copy of the resource without interacting with other entities in the system.

First, the original resource and the cached copies of the resource cannot be synchronized. When the original resource on the Original Hosting Entity is updated, the cached copies on the Caching Entities cannot be updated. For example, when the original copy of the resource on the M2M Gateway 1002 is updated, the M2M Gateway 1002 is not able to send a message to update the cached copy hosted on the M2M server. Therefore, when a M2M Application retrieves the resource, the M2M server may return an out of date cached copy of the resource, as illustrated in FIG. 12.

As another example, when the original resource on the Original Hosting Entity is deleted, the cached copies on the Caching Entities cannot be deleted. For example, when the original copy of the resource on the M2M Gateway 1002 is deleted, the M2M Gateway 1002 is not able to send a message to delete the cached copy on the resource hosted on the M2M server. Therefore, when a M2M Application retrieves the resource, the M2M server may return an invalid cached copy of the resource.

Additionally, an Original Hosting Entity may be unable to obtain information and statistics regarding accesses made to the cached copies of resources. For example, the M2M Gateway 1002 may want to track how many times a resource is retrieved, which entities performed the retrieval and at what time of day, etc. Therefore, if the M2M Server creates a cached copy without communicating with the M2M Gateway 1002, the M2M Gateway 1002 will not be able to obtain this type of information.

Figure 13:
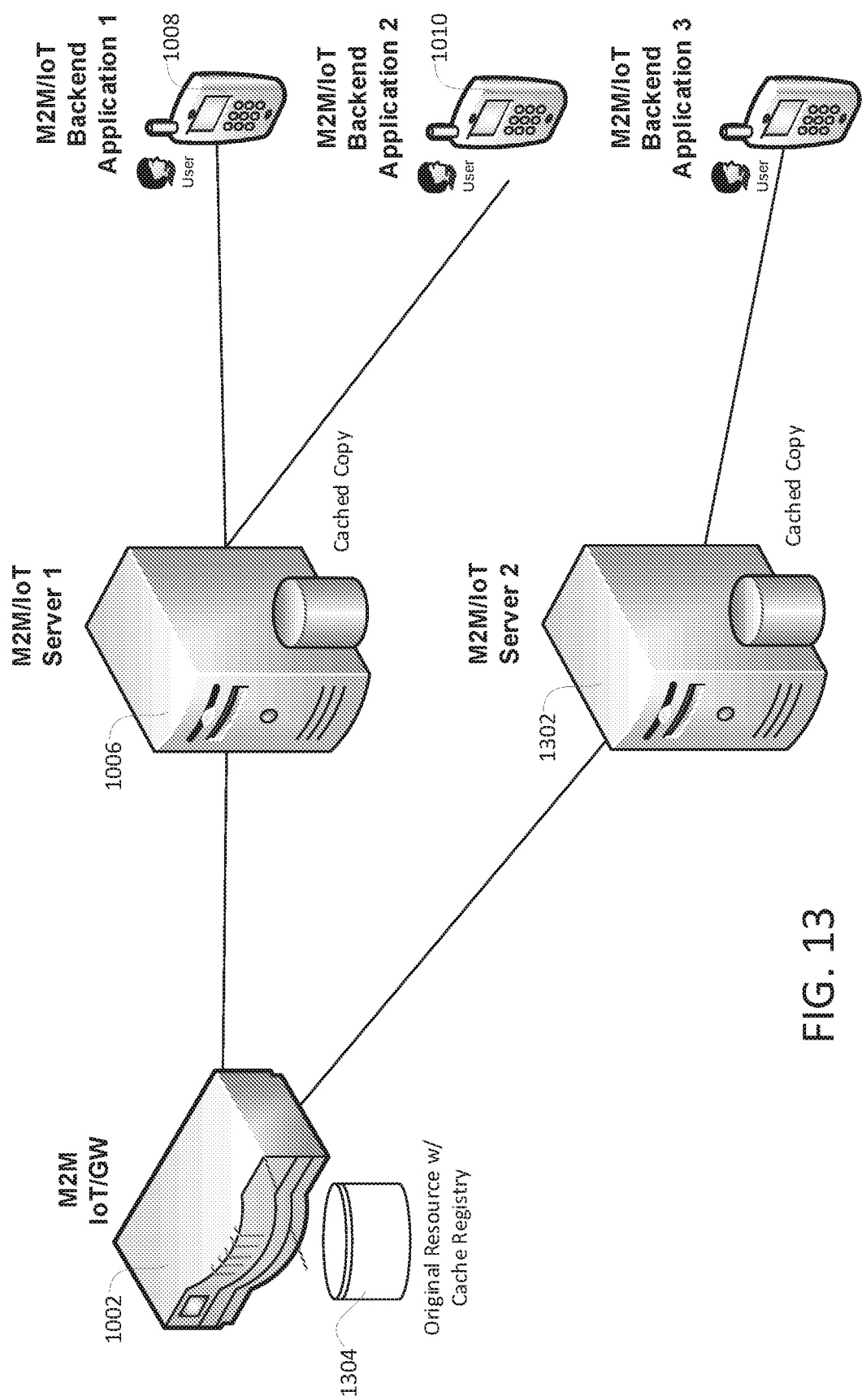
FIG. 13 is a diagram that illustrates service layer cache management system

FIG. 13 illustrates one embodiment of an SL cache management system. As shown, SL entities, e.g. M2M Servers 1006 and 1302, can host a cached copy of the original resource. A SL cache registry 1304 is used on the Original Hosting Entity, e.g. M2M Gateway 1002. The SL cache registry 1304 is used to keep track of other SL entities 1006 and 1302 hosting cached versions of the resource.

Figure 14:
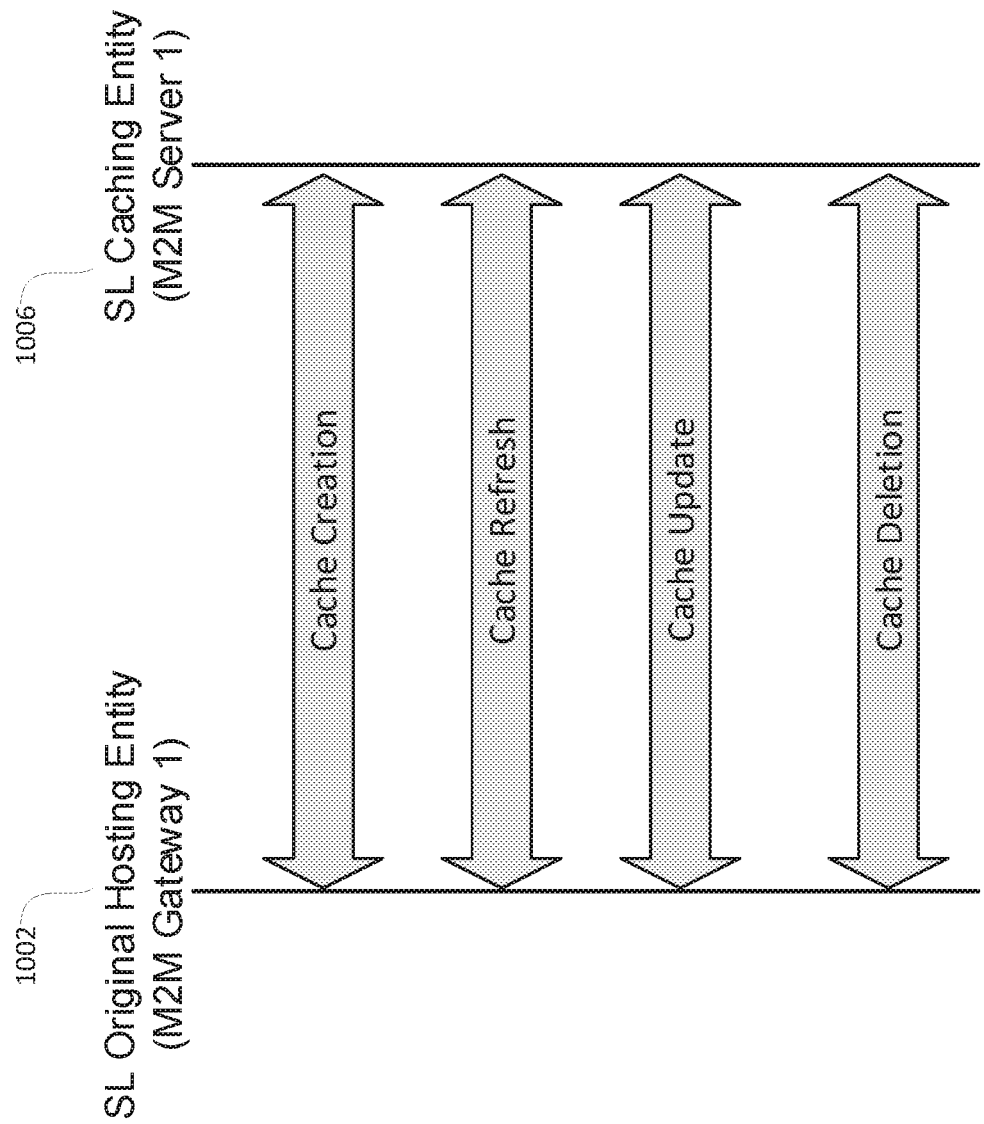
FIG. 14 is a flow chart that illustrates methods to support a cache management system

As illustrated in FIG. 14, new methods are described for creating, refreshing, updating and deleting SL cached resources. These methods include a method for creating a cached copy of a resource at a Cache Entity; a method for refreshing SL cached resources to keep the cached resources on the Caching Entities; a method for updating SL cached resources to keep them synchronized when their corresponding original resources are updated, and methods for deleting SL cached resources.

Note, for illustrative purposes, the SL entity that hosts the original resource is shown as an M2M Gateway 1002 and the Caching Entity is shown as an M2M Server. It will be noted the SL entity hosting an original or cached resource could be an M2M Gateway 1002, Server or Device and the descriptions provided in this document are not meant to be limiting.

Several methods are described for an entity to create a cached copy of a SL resource.

Method Initiated by a Caching Entity for Creating a SL Cached Resource

Figure 15:
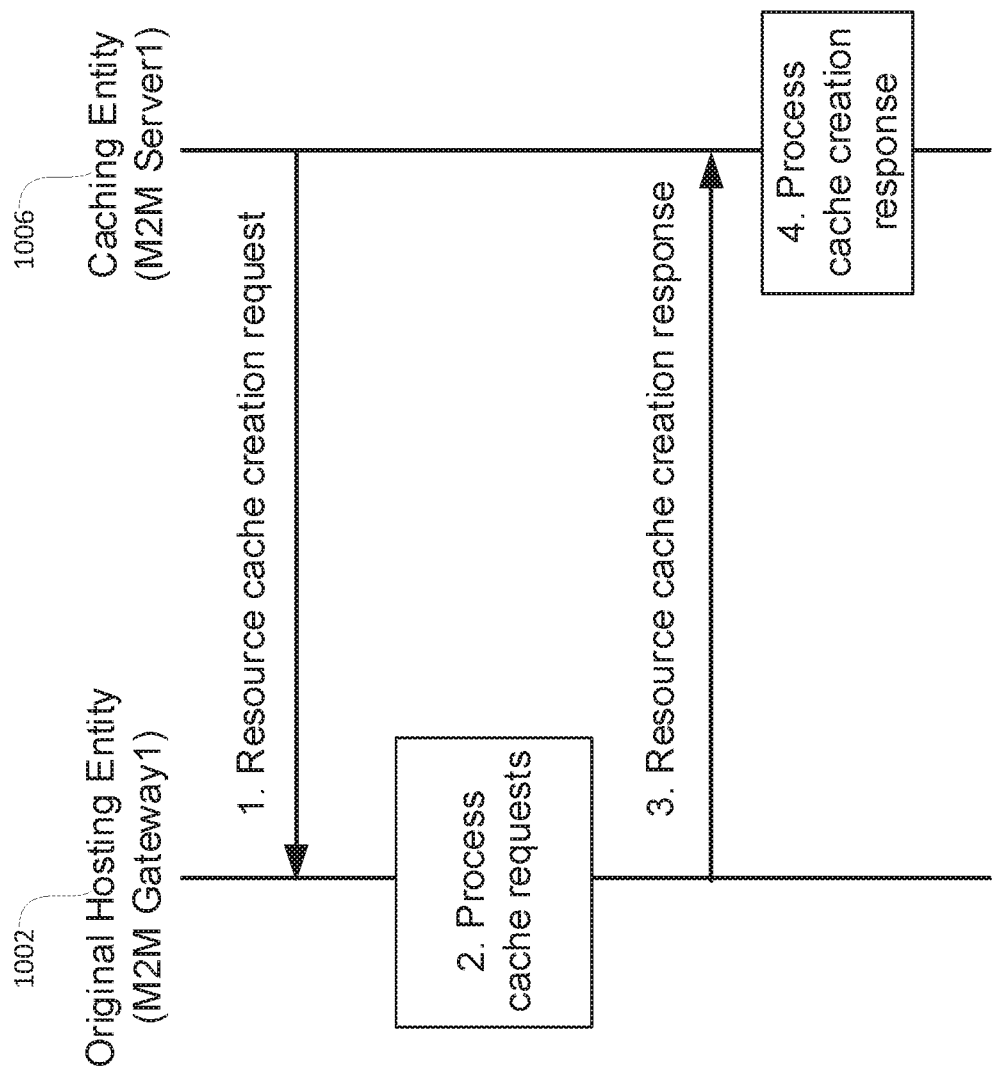
FIG. 15 is a flow chart that illustrates method initiated by a caching entity for creating a SL Cached Resource

FIG. 15 illustrates one embodiment of a method initiated by a Caching Entity for creating a SL cached resource. An Entity, e.g. a M2M server, may initiate this process if it frequently receives requests that retrieve the same resource, e.g. more than K times in a second. Alternatively, an application could explicitly indicate that a resource should be cached by sending a message that indicates a specific URI should be cached, by setting an attribute that is associated with the URI to be cached, etc.

In step 1 of FIG. 15, the Caching Entity (i.e. M2M Server) that intends to create a cached copy of a SL resource sends a resource cache creation request to the Original Hosting Entity (i.e. M2M Gateway 1002). The request may contain information as shown in Table 1.

Note that this request could be a CRUD operation that targets the OriginalResourceURI. The fields of Table 1, other than the OriginalResourceURI, could be attributes of the OriginalResourceURI.

TABLE 1

Fields in a Cache Creation Request

| Fields name | Description |
| --- | --- |
| OriginalResourceURI | The URI of the original resource |
| CachedResourceURI | The proposed URI where the requesting SL entity intends to cache the original resource. This URI may be used between the Original Hosting Entity and the Caching Entity for cache management and may not be visible to other entities in the network. |
| Content Retrieve Flag | Indicate whether the Original Hosting Entity includes the content of the original resource in the cache creation response, since the Caching Entity may already cached the resource and just wants to do a registration to Original Hosting Entity. |
| Proposed Cache Expiration Time (optional) | The proposed expiration time of the cached resource. The Original Hosting Entity can take this under advisement when selecting and returning a cache expiration time within a resource cache response. |
| Proposed access control privileges (optional) | The proposed access control privileges of the cached resource. The Original Hosting Entity can take this under advisement when selecting and returning access control privileges within a resource cache response. |

Figure 16:
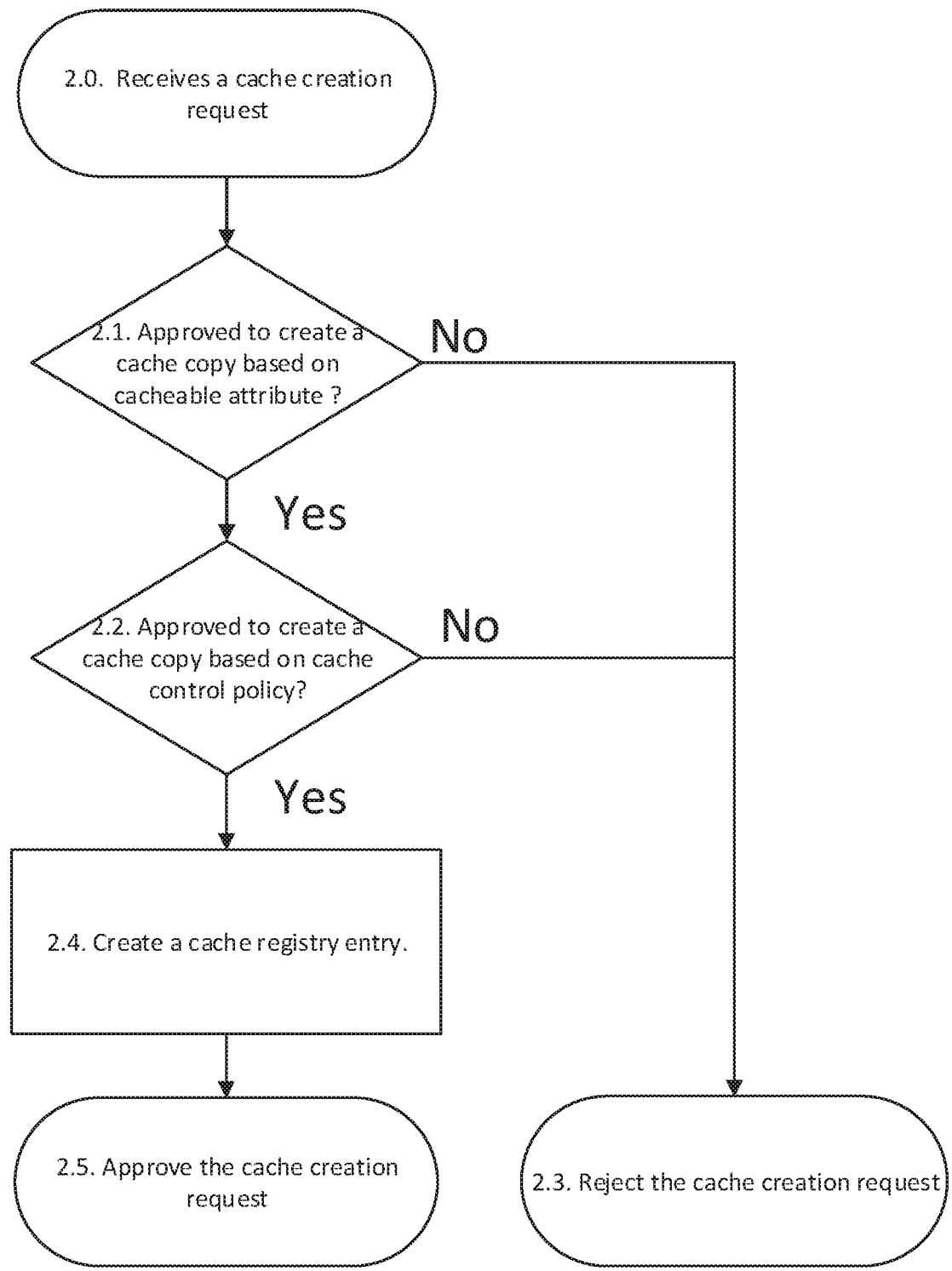
FIG. 16 is a flow chart that illustrates procedures for an original resource hosting entity to process a cache creation request

In step 2 of FIG. 15, after receiving the request, the Original Hosting Entity 1002 accepts or rejects the cache creation request based on policies as shown in FIG. 16.

In step 2.1 of FIG. 16, the Original Hosting Entity 1002 first checks a "cacheability" attribute associated with the resource. The attribute (cacheability) is a common resource attribute that can be used to distinguish whether a particular resource is cacheable or not. This attribute could be configured in multiple ways. In one implementation, it could be configured by the application that creates the resource. In another implementation, it could be configured by the SL entity that hosts the resource.

In step 2.2 of FIG. 16, the Original Hosting Entity 1002 determines whether the entity that sends the request is granted permission to cache the resource. The Original Hosting Entity 1002 checks the cached control policy of the requested resource. The cached control policy can be a standalone policy or as an enhancement of Access Control Policy (ACP). In the cached control policy, a list of IDs of SL entities that are allowed to cache resources are stored in the cached control policy. Using this cached control policy, the Original Hosting Entity 1002 can check the ID of a Caching Entity 1006 that is initiating a cache request for a targeted resource and compare this ID against the caching privileges of the ACP associated target resource. If the ID matches, then permission can be granted to allow the caching to be performed, otherwise it can be denied.

In step 2.3 of FIG. 16, if the requested resource cannot be cached, the Original Hosting Entity 1002 will send a rejection in the resource cache creation response.

In step 2.4 of FIG. 16, if the requested resource can be cached, the Original Hosting Entity 1002 adds an entry in its SL cache registry 1304, the detail information and format of the SL cache registry 1304 is shown in Table 2. Note that since a resource could be cached by multiple entities, there may be multiple entries in the Cache registry 1304 for a given original resource.

In step 2.5 of FIG. 16, the Original Hosting Entity 1002 accepts the cache request.

TABLE 2

Fields of an Entry in the Cache registry 1304

| Fields name | Description |
| --- | --- |
| CachedResourceURI | The URI of the cached resource hosted on a SL Caching Entity |
| CachingEntityID | SL ID of the SL entity that hosts the cached SL resource |
| Cache Creation Time | The time at which the cached copy of the resource was created or updated. This information can be used by an Original Hosting Entity to determine if a cached copy is up to date with the last modified version of the original resource. |
| Cache Expiration Time | The time that the cached SL resource shall expire and be deleted |
| Access Control Privileges | The access control privileges configured for the cached resource. |

In step 3 of FIG. 15, the Original Hosting Entity 1002 will send the resource cache creation response to the Caching Entity 1006. The response contains information as shown in Table 3. In the message, the Original Hosting Entity 1002 notifies whether it allows the Caching Entity 1006 to create a cache copy of the resource. Note that this request could be a CRUD operation that targets the CachedResourceURI. The fields of Table 3, other than the CachedResourceURI, could be attributes of the original resource.

TABLE 3

Fields in a Cache Creation Response

| Fields name | Description |
| --- | --- |
| OriginalResourceURI | The URI of the original resource |
| CachedResourceURI | The URI of the cached resource hosted on a SL caching entity. This URI serves as an identifier to pair the cache request and response. |
| Cache Decision | The original hosting entity indicates whether to allow the entity to cache the resource. |
| Resource Content (optional) | The content of the original resource |

TABLE 3-continued

Fields in a Cache Creation Response

| Fields name | Description |
|---|---|
| Access Control Privileges (optional) | The access control privileges configured for the cached resource. |
| Cache Expiration Time (optional) | The time that the cached SL resource shall expire and be deleted |
| Entry Read Count | The number of times that CachedResourceURI has been read. This value may be reset when event the cache is refreshed or whenever this value is read by the original hosting entity. |
| Additional attributes and sub-resource (optional) | Additional attributes and sub-resource that associate with the original resource. |

Figure 17:
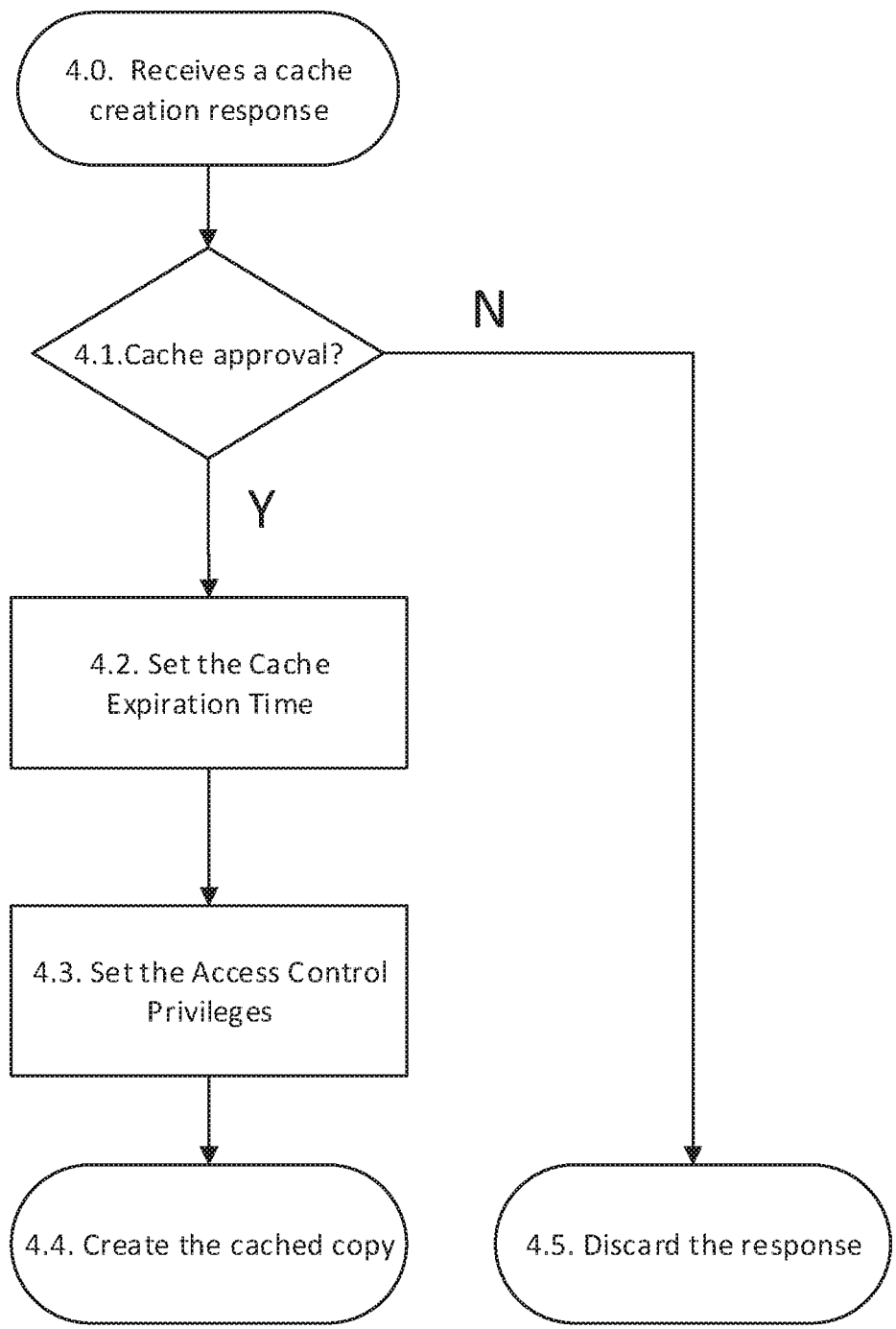
FIG. 17 is a flow chart that illustrates procedures for a cached resource hosting entity to process a received cache response

In step 4 of FIG. 15, the Caching Entity 1006 will process the cache response as shown in FIG. 17. If the entity is allowed to cache the resource, it stores a cached copy of the content under the cached resource URI in Table 3 along with additional attributes and sub-resources in Table 3.

In step 4.1 of FIG. 17, the Caching Entity 1006 first checks the Cache Decision filed in the response message. It goes to step 4.2 if the request is approved and goes to step 4.5 otherwise.

In step 4.2 of FIG. 17, the Caching Entity 1006 sets the expiration time of the cached copy based on the value in the cache response message. If there is no expiration time in the cache response message, it will set the cache expiration time by itself.

In step 4.3 of FIG. 17, the Caching Entity 1006 sets the Access Control Policy of the cached copy based on the value in the cache response message. If there is no Access Control Policy in the cache response message, it will set the Access Control Policy by itself.

In step 4.4 of FIG. 17, the Caching Entity 1006 stores a copy of the content under the URI, which is the cachedResourceURI in Table 3 along with additional attributes and sub-resources in Table 3. This URI is used between the Original Hosting Entity 1002 and the Caching Entity 1006 for cache management and is not visible to other entities in the network.

In step 4.5 of FIG. 17, the Caching Entity 1002 will discard the cache response and will not create a cached copy of the resource.

Figure 18:
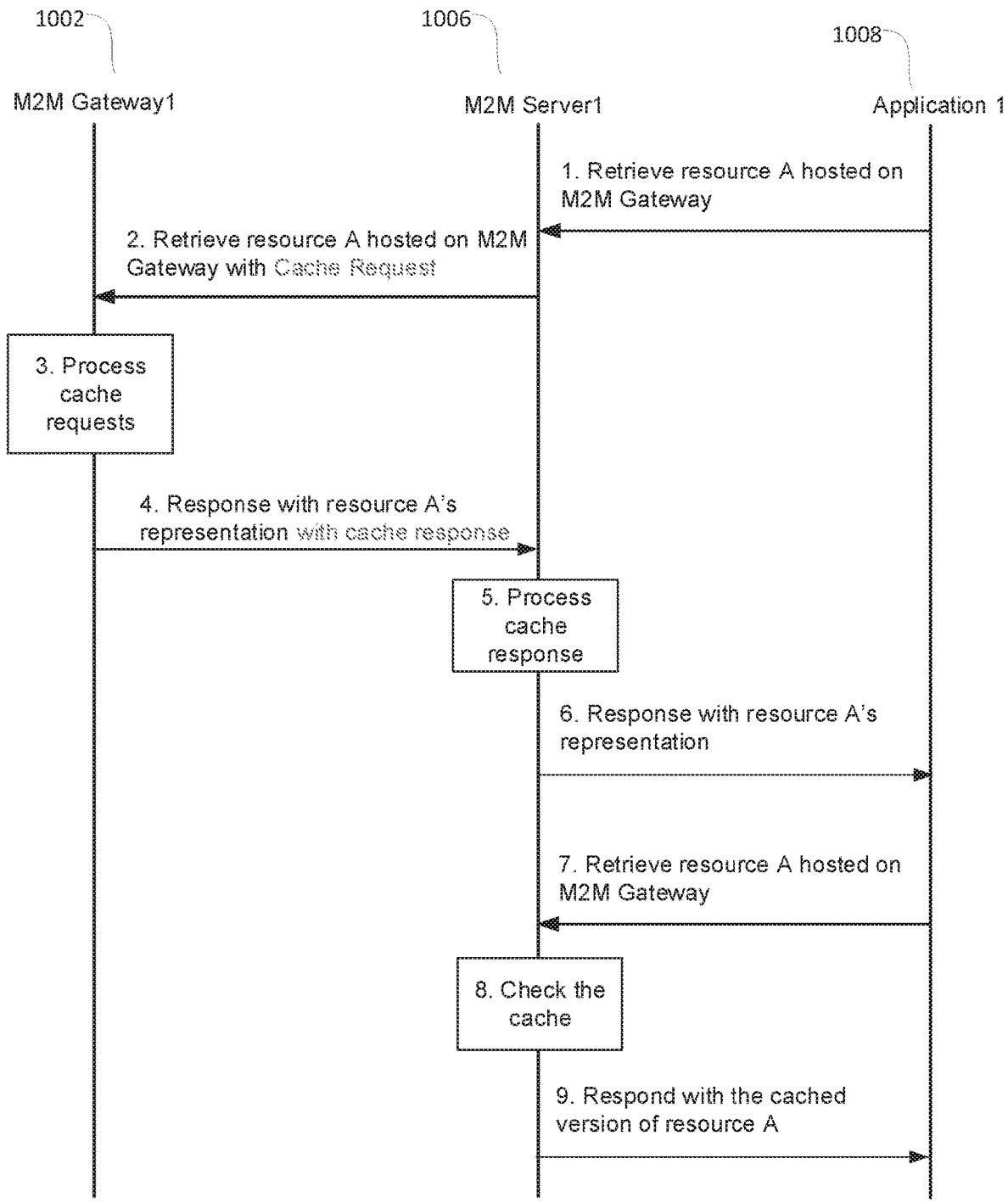
FIG. 18 is a flow chart that illustrates an M2M server creates a cached copy of a resource when a client retrieves the resource.

As illustrated in FIG. 18, a Resource Cache Creation Request message can be sent independently or can be embedded in a resource retrieval request. Similarly, the Resource Cache Creation Response message can be embedded in a resource retrieval response sent by the M2M Gateway 1002.

Figure 33A:
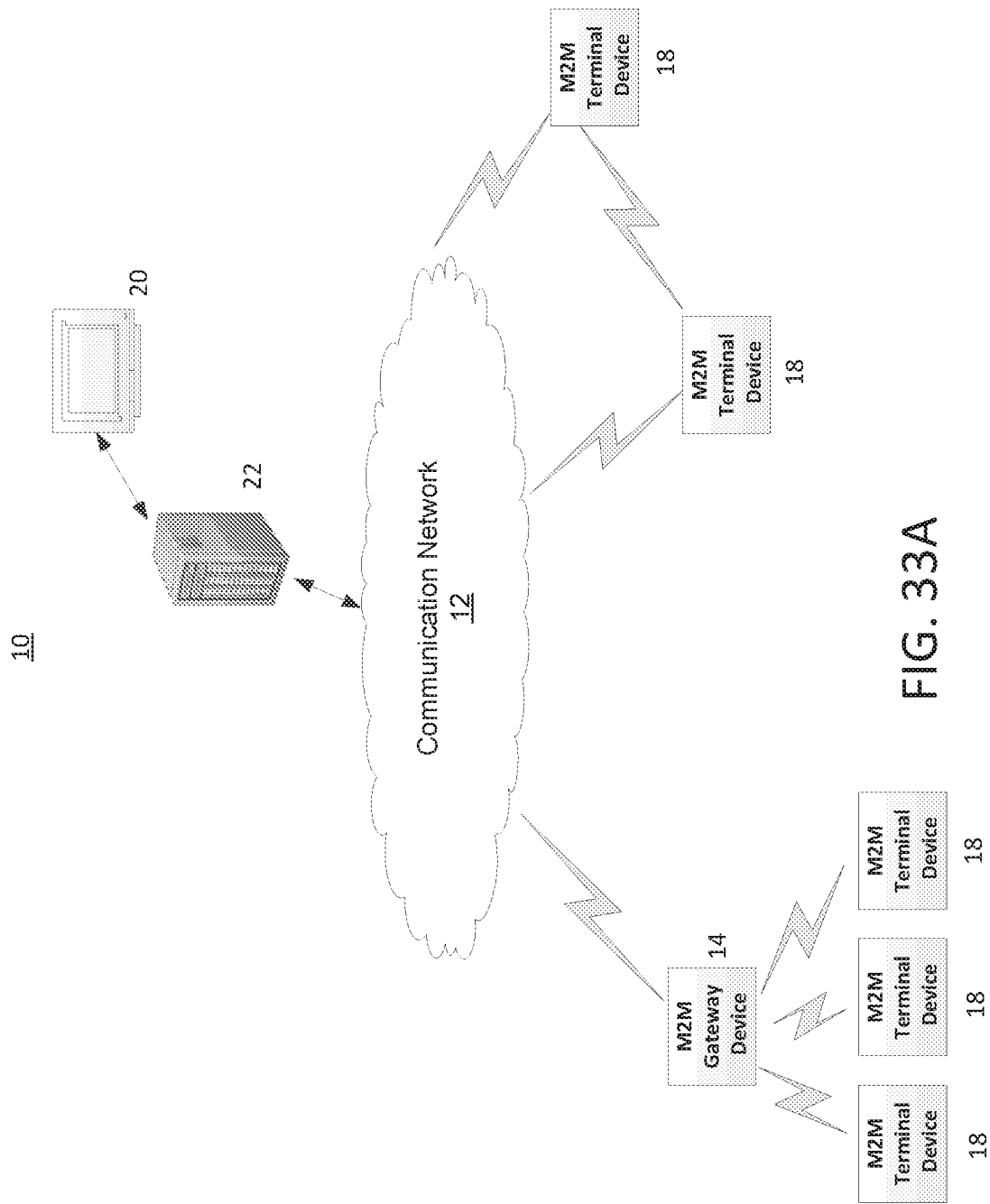
FIG. 33A is a diagram of a M2M/IoT/WoT communication system that includes a communication network.
Figure 33B:
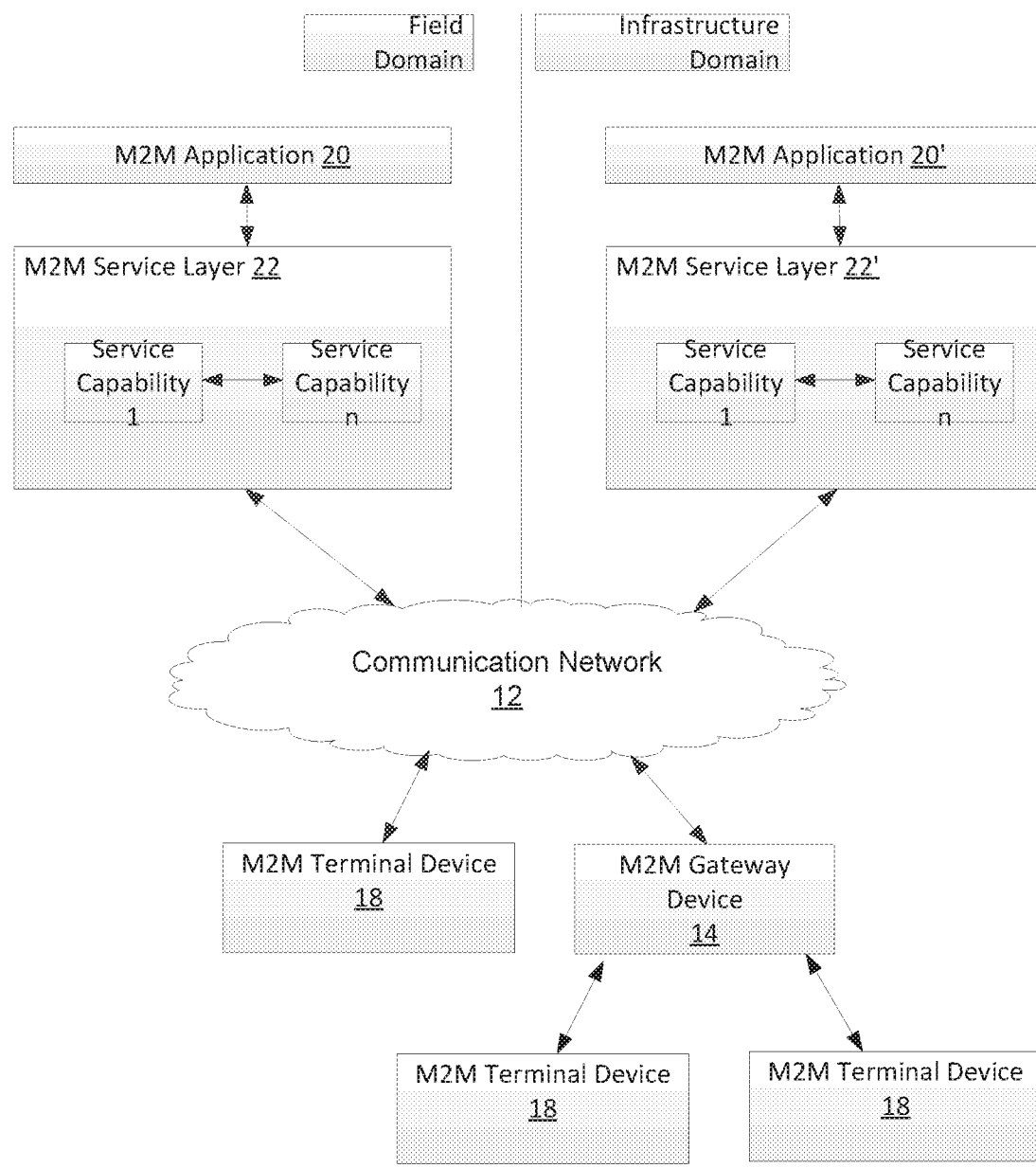
FIG. 33B is a diagram of an illustrated M2M service layer in the field domain that provides services for the M2M application, M2M gateway devices, and M2M terminal devices and the communication network.
Figure 33C:
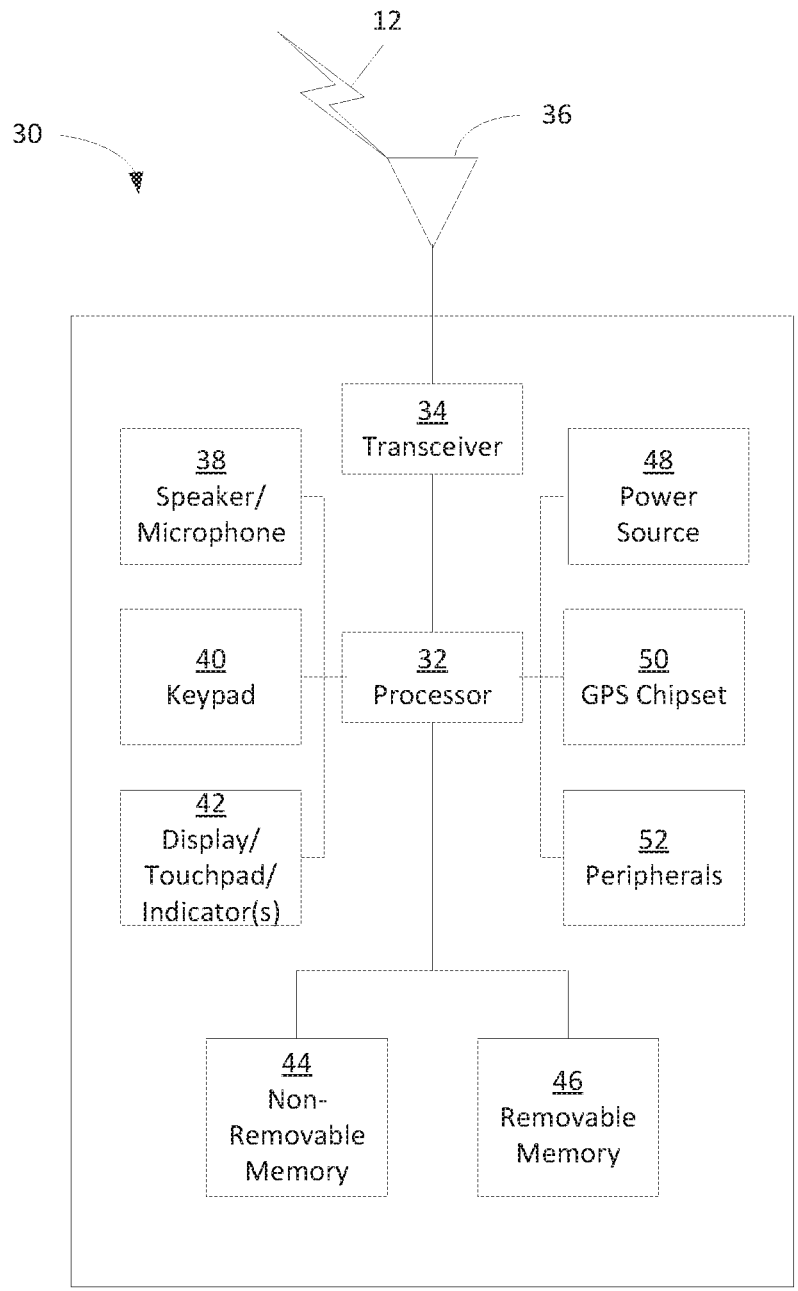
FIG. 33C is a diagram of an exemplary device that may be used to implement any of the network nodes, devices or apparatuses described herein.
Figure 33D:
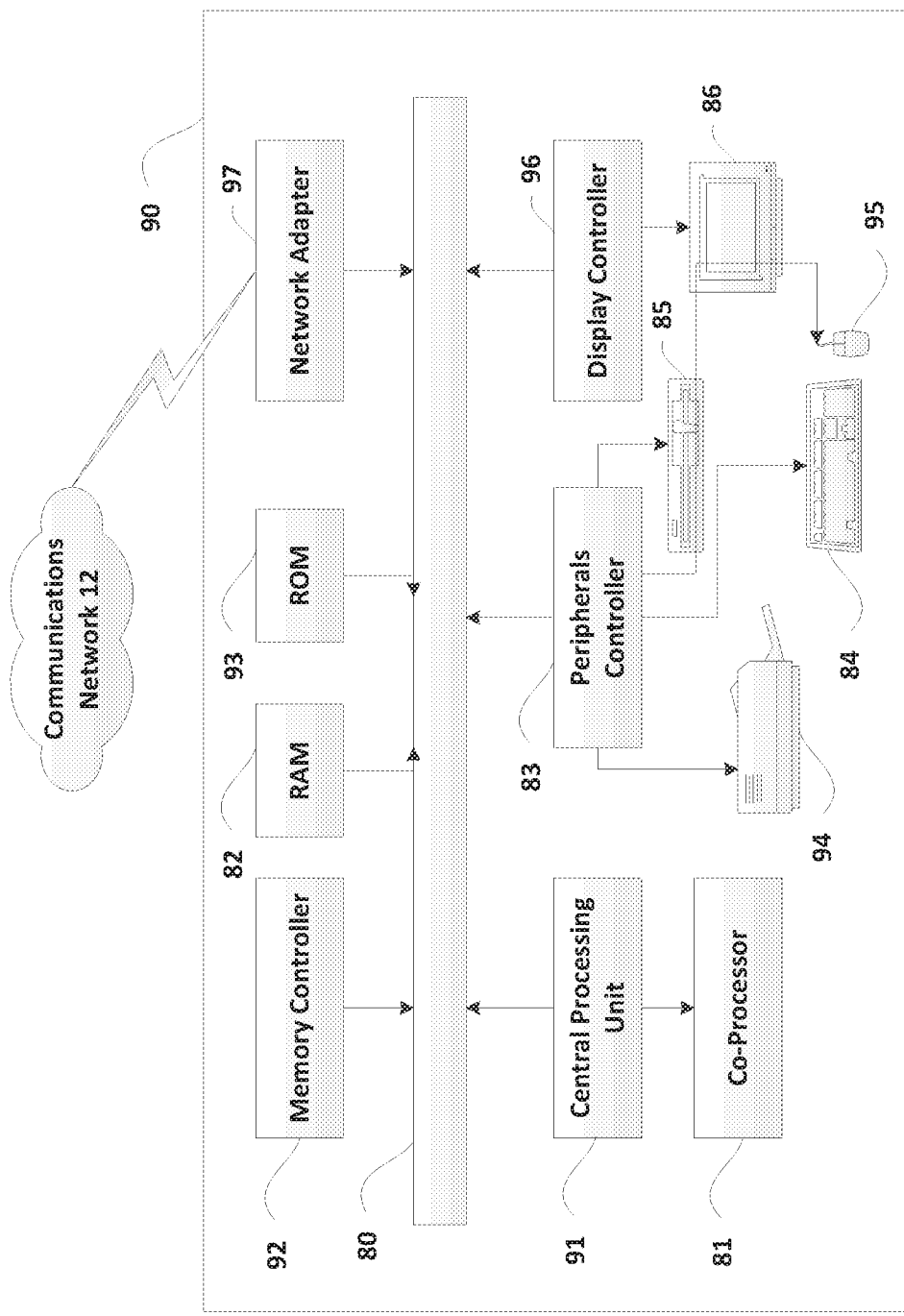
FIG. 33D is a block diagram of a computer system or server that may be used to implement any of the network nodes, devices or apparatuses described herein.

It is understood that the entities performing the steps illustrated in FIGS. 15-18, such as the Original Hosting Entity (M2M Gateway) 1002 and Caching Entity (M2M Server1) 1006, may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIGS. 15-18 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIGS. 15-18. It is also understood that the functionality illustrated in FIGS. 15-18 may implemented as a set of virtualized network functions. The network functions may not necessarily communicate directly, rather, they may communicate via forwarding or a routing function. It is also understood that any transmitting and receiving steps illustrated in FIGS. 15-18 may be performed by communication circuitry of the respective apparatus under control of the processor of the apparatus and the computer-executable instructions (e.g., software) that it executes.

Figure 19:
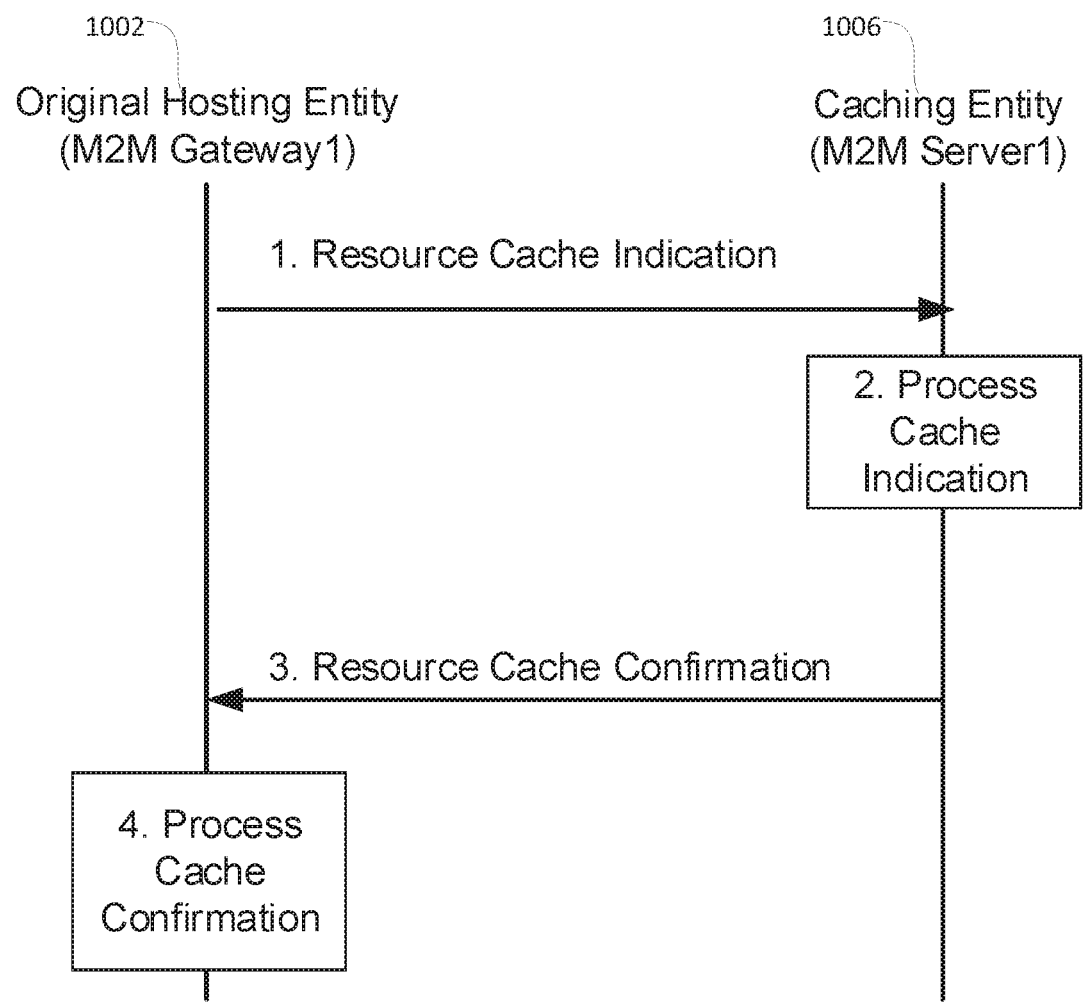
FIG. 19 is a flow chart that illustrates a method initiated by an original hosting entity for creating cached SL resource

Method Initiated by an Original Hosting Entity for Creating a SL Cached Resource FIG. 19 illustrates one embodiment of a method initiated by an Original Hosting Entity for creating a SL cached resource. In this method, the M2M Gateway 1002 initiates the SL resource cache creation process. Note that, in the oneM2M service layer announced resource methods, the M2M Gateway 1002 cannot create a resource announcement unless an AE or CSE changes the Announce To attribute associated with the original resource. However, in one embodiment, the original resource hosting entity does not require a third party entity to trigger the cache creation procedure. For example, the original resource hosting entity can initiate the cache creation process based on the location information provided by an M2M server during a retrieve of a resource. In another example, the original resource hosting entity can initiate the cache creation process when an M2M server retrieves a resource frequently. Moreover, in the service layer caching scheme, an entity, e.g. an application, can access the cached resource using the URI that is the same as it access the original resource. However, in the announced resource scheme, an announced resource has a different URI from the original resource.

In step 1 of FIG. 19, the Original Hosting Entity (i.e. M2M Gateway 1002) sends a resource cache indication message to the SL entity that would create a cached copy. The resource cache indication contains information as shown in Table 4. Additionally it may indicate to the caching entity that it wants the caching entity to collect statistics about how often the cached copy is accessed. These statistics may be used by the Original Hosting entity to make decisions about whether or not the cached copy should be maintained. For example, if the cache is never read, then the original hosting entity may decide to delete the cache entry and cache a different resource.

In step 2 of FIG. 19, after receiving the Resource Cache Indication, the Caching Entity decides whether it creates a cached copy of the resource. For example, if the entity does not support resource caching or it does not have enough memory to store a cached resource, it will not create a cached copy of the resource.

In step 3 of FIG. 19, the Caching Entity sends its decision in the Resource Cache Confirmation as shown in Table 5. If it has created a cached copy of the resource, it sends the URI of the cached resource.

In step 4 of FIG. 19, the Original Hosting Entity processes the cache confirmation. If the Caching Entity has cached the resource, it adds an entry in the SL Cache Registry registration table, the detailed information of a SL Cache registry 1304 is shown in Table 2.

TABLE 4

Fields in a Resource Cache Indication

| Fields name | Description |
| --- | --- |
| OriginalResourceURI | The URI of the resource on the original hosting entity |
| Resource Content | The content of the original resource |
| Additional attributes and sub-resource (optional) | Additional attributes and sub-resource that associate with the original resource, for example, proposed access control policy and expiration time. The request may also indicate that the caching entity should maintain statistics about how often the cached copy is accessed. |

TABLE 5

Fields in a Resource Cache Confirmation

| Fields name | Description |
| --- | --- |
| Cache Decision | The original hosting entity indicates whether it has created a cached copy of the resource. |
| CachedResourceURI | The URI the of the cached resource a caching entity has stored |
| Additional attributes and sub-resource (optional) | Additional attributes and sub-resource that associate with the original resource, for example, agreed upon access control policy and expiration time. The response may indicate whether or not the caching entity is willing to collect statistics about how often the cached copy is accessed. |
| CacheResourceStatsURI | An Uri that is used to store statistics about how often and at what times the cached copy is accessed. |

Figure 20:
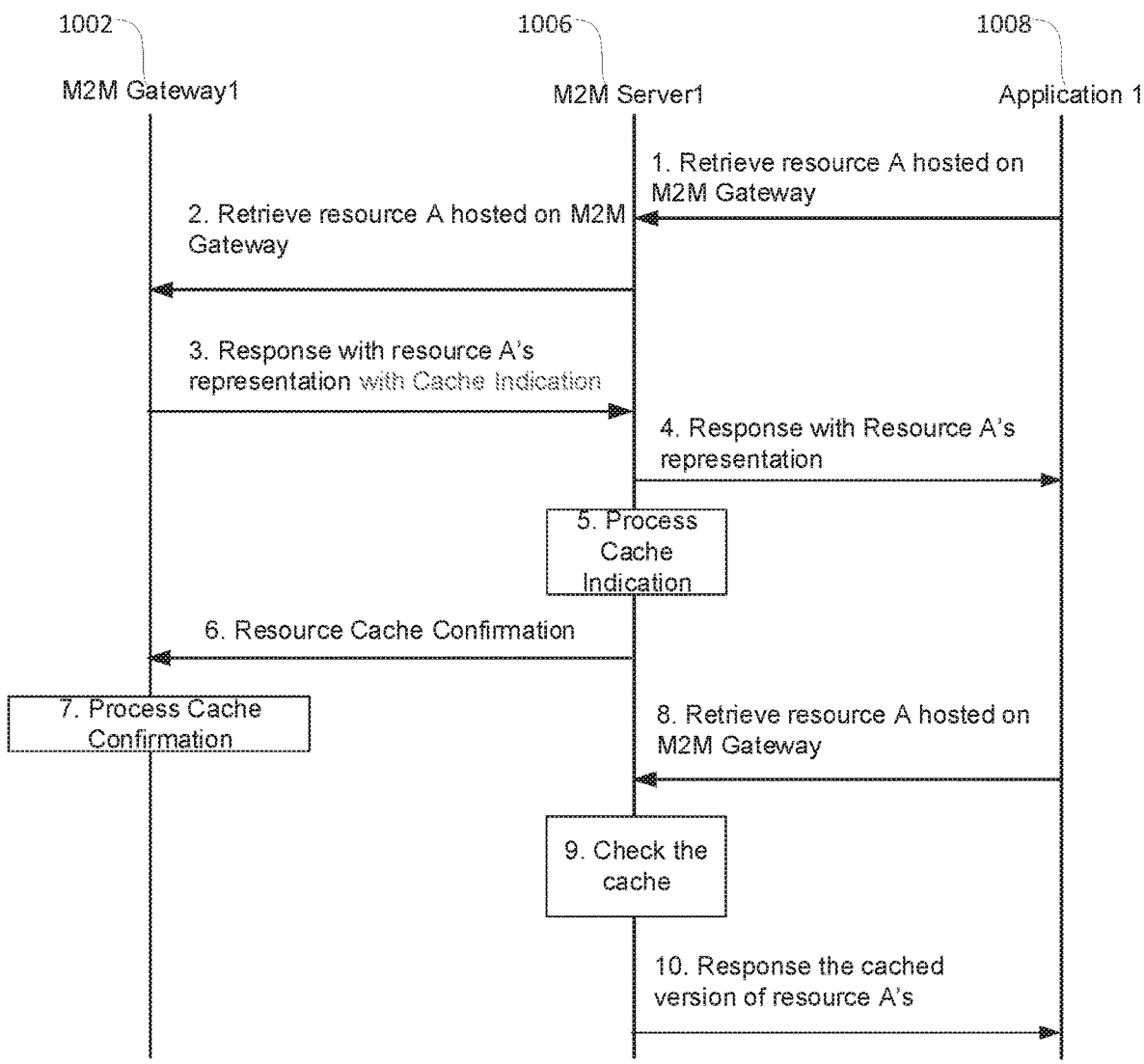
FIG. 20 is a flow chart that illustrates an M2M Gateway proactively creates a cache copy when a client retrieves the resource.

As illustrated in FIG. 20, the Resource Cache Indication message can be embedded in a resource retrieval response sent by the M2M Gateway 1002.

In step 1 of FIG. 20, application 1 sends a request to retrieve resource "A", hosted on the M2M Gateway 1002.

In step 2 of FIG. 20, M2M Server 1 forwards the request to M2M Gateway 1002 since it does not have a cached copy of the resource "A" that is hosted on M2M Gateway 1002.

In step 3 of FIG. 20, when processing the request, M2M Gateway 1002 may detect that M2M Server 1006 has retrieved the same resource frequently, e.g. more than k times in a minute. Therefore, M2M Gateway 1002 requests the M2M Server 1006 to create a cache copy of the resource in order to reduce its workload.

In step 4 of FIG. 20, the M2M Gateway 1006 inserts a Cache Indication message inside the response message. The resource cache indication contains information as shown in Table 4.

In step 5 of FIG. 20, after receiving the response, M2M Server 1002 sends a response with the resource representation of resource "A" to Application 1008.

In step 6 of FIG. 20, M2M Server 1006 will extract the Cache Indication message from the response, and decides whether it will create a cached copy of the resource.

In step 7 of FIG. 20, M2M Server 1006 sends its decision in the Resource Cache Confirmation as shown in Table 5. If it has created a cached copy, it sends the URI of the cached resource.

In step 8 of FIG. 20, M2M Gateway 1006 process the cache confirmation. If the caching entity has cached the resource, it adds an entry in the SL Cache registry 1304. The detailed information of a SL Cache registry 1304 is shown in Table 2.

In step 9 of FIG. 20, application 1008 sends a request to retrieve resource "A", hosted on the M2M Gateway.

In step 10 of FIG. 20, the M2M Server 1006 check its cache and find the cached resource.

In step 11 of FIG. 20, the M2M Server 1006 sends a response with the resource representation of cached resource "A" to Application 1008.

It is understood that the entities performing the steps illustrated in FIGS. 19-20 may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIGS. 19-20 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIGS. 19-20. It is also understood that the functionality illustrated in FIGS. 19-20 may implemented as a set of virtualized network functions. The network functions may not necessarily communicate directly, rather, they may communicate via forwarding or routing function. It is also understood that any transmitting and receiving steps illustrated in FIGS. 19-20 may be performed by communication circuitry of the apparatus under control of the processor of the apparatus and the computer-executable instructions (e.g., software) that it executes.

Method to Refresh SL Cached Resources

A cached copy of a SL resource may be removed if the expiration time associated with the cached resource expires. Moreover, the expiration time associated with a SL Cache registry 1304 entry may also expire and be removed by the Original Hosting Entity. Therefore, cache refresh methods are desirable in order for the Caching Entity keeps storing the cached resource. Two cache refresh methods are described herein to maintain a cached resource in a Caching Entity.

Cache Refresh Method Initiated by a Caching Entity

Figure 21:
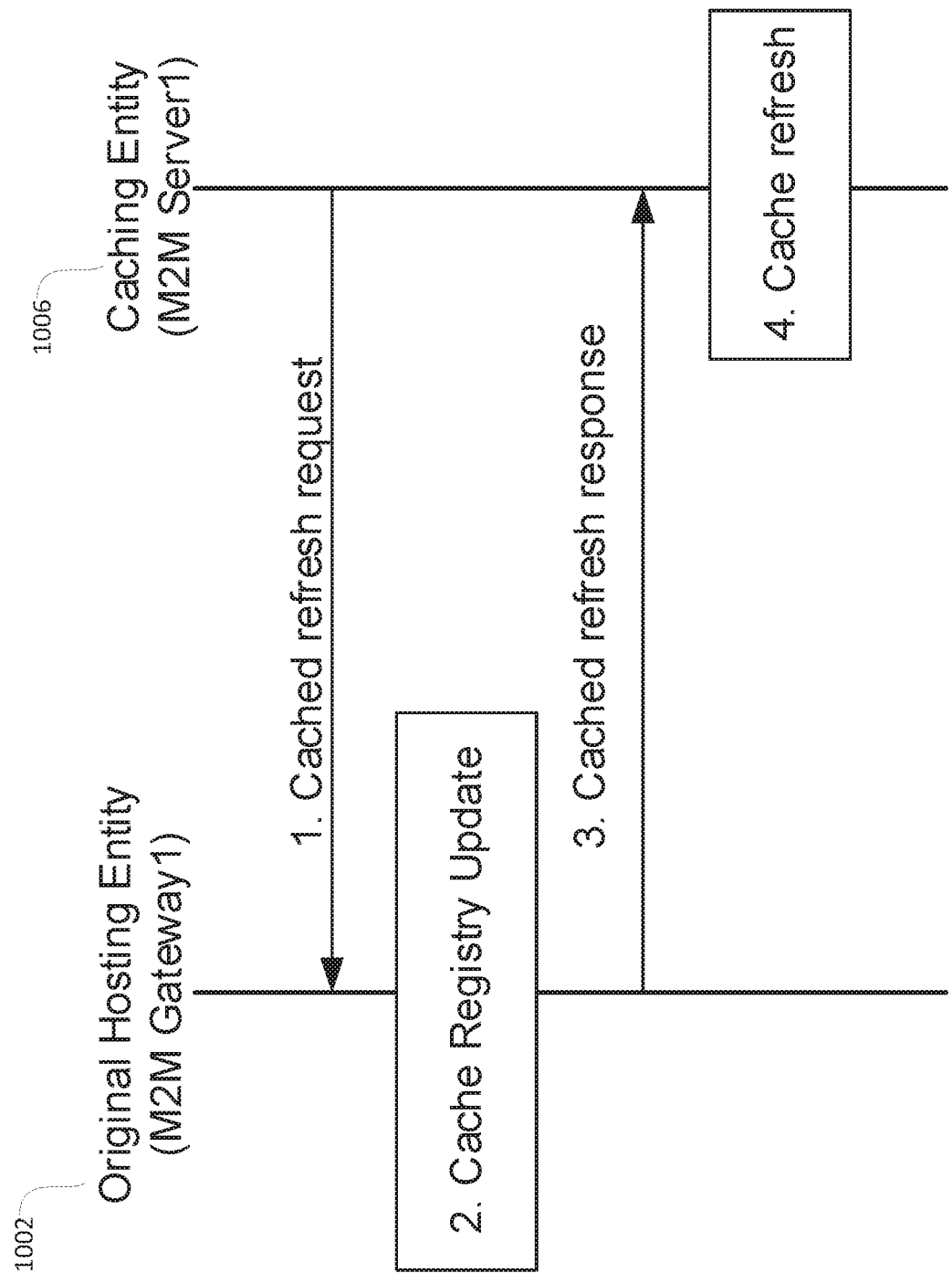
FIG. 21 is a flow chart that illustrates a cache refreshment method initiated by a caching entity for a caching entity to maintain a cached copy

FIG. 21 illustrates one embodiment of a method by which a Caching Entity, e.g. M2M Server, can refresh a cached copy of a SL resource before the expiration time associated with the cached copy expires.

In step 1 of FIG. 21, the Caching Entity sends a Cache Refresh Request to the Original Hosting Entity. The Cache Refresh Request contains information as shown in Table 6. The cache Refresh Request contains the new proposed cache expiration time and statistics associated the cached resource. For example, how frequently the cached resource has been retrieved and how many times it has been retrieved since the last refresh. The Original Hosting CSE can better manage the resource by knowing these statistics information. For example, the Original Hosting CSE may control how many times the resource can be accessed by a user. In another example, the Original Hosting CSE may charge fee to the user based on how many times the resources are accessed.

In step 2 of FIG. 21, the Original Hosting Entity processes the Cached Refresh Request. The Original Hosting Entity obtains the statistic of the cached resource, and may decide whether to allow the Caching Entity to continue caching the resource. For example, the Original Hosting Entity allows the Caching Entity to continue to cache the resource if the cached resource has been retrieved frequently. If it decides that the Caching Entity can continue to cache the copy, it will provide a new value of the expiration time. This value will be stored in the SL Cache registry 1304 as well as returned in the response. Otherwise, it will initiate deleting the cached copy and also deleting the corresponding entry from the SL Cache registry 1304.

In step 3 of FIG. 21, the Original Hosting Entity sends the cache refresh response to the Caching Entity. The request contains information as shown in Table 7.

In step 4 of FIG. 21, the Caching Entity processes the cache refresh response as follows. If the Caching Entity is allowed to cache the resource, it will set a new value to the expiration time of the cached copy and update the resource content and attribute based on the information in the response. It will also begin collecting a new set of statistics for the cached resource. Otherwise, it can initiate a cache deletion process.

TABLE 6

Fields in a Cache Refresh Request

| Fields name | Description |
| --- | --- |
| OriginalResourceURI | The URI of the resource on the original hosting entity |
| CachedResourceURI | The URI the of the cached resource a caching entity intends to store |
| Cache Expiration Time | The time that the caching entity deletes the cache copy of the resource. |
| Resource Retrieval Statistics | The statistics information that the cached resource is retrieved on the Caching Entity. For example, the frequency the cached copy is retrieved by other entities and/or how many times it has been retrieved since the last refresh. |

TABLE 7

Fields in a Cache Refresh Response

| Fields name | Description |
| --- | --- |
| Decision | The original hosting entity indicates whether to allow the entity to cache the resource. |
| Resource Content (optional) | The content of the original resource |
| Additional attributes and sub-resource (optional) | Additional attributes and sub-resource that associate with the original resource, for example, access control policy and expiration time. |

Cache Refresh Method Initiated by an Original Hosting Entity

Figure 22:
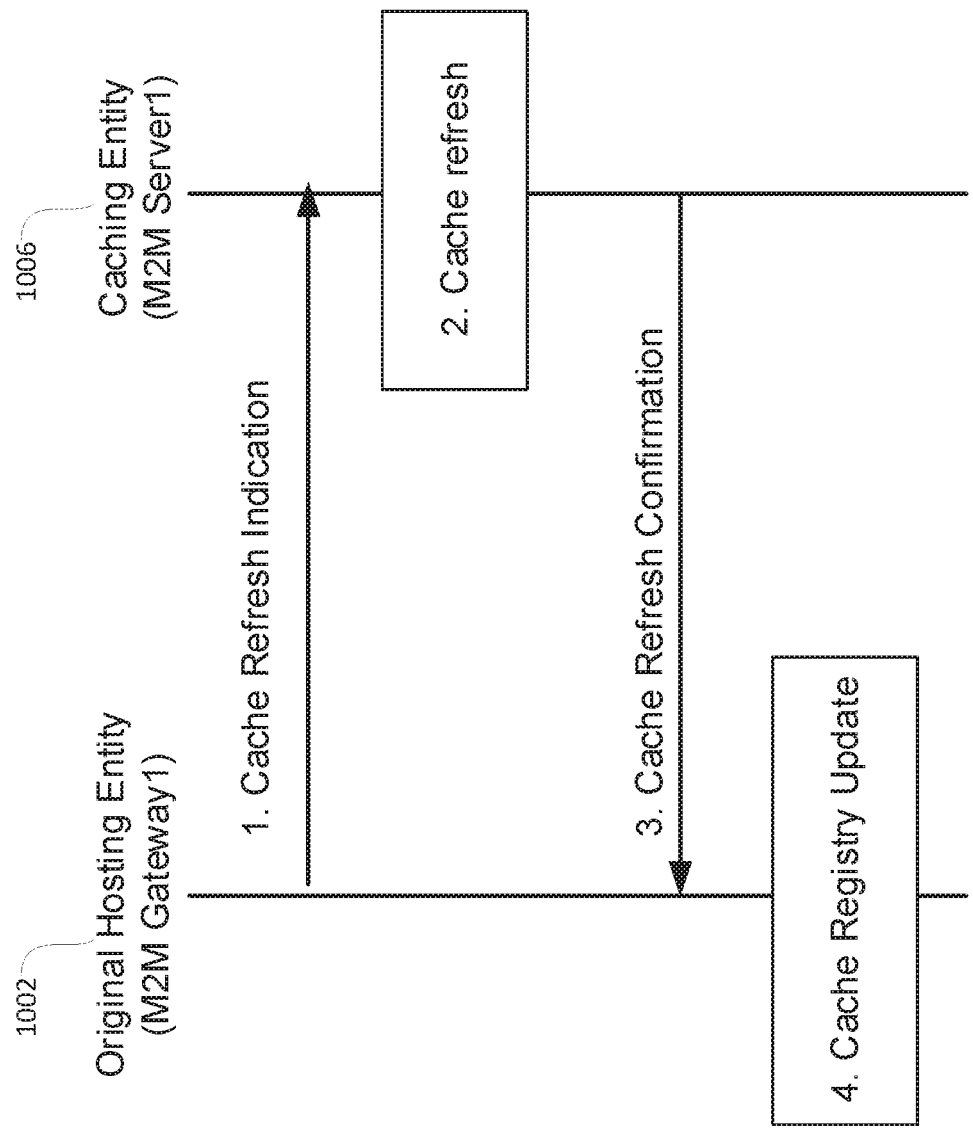
FIG. 22 is a flow chart that illustrates a proactive cache refreshment method for a caching entity to maintain a cached copy

FIG. 22 illustrates one embodiment of a method by which an Original Hosting Entity e.g. M2M Gateway 1002, can refresh a cached copy of a SL resource.

The Original Hosting Entity 1002 may trigger the proactive cache refreshment process in many situations. For example, the process is triggered if the expiration time associated with the resource cached registry is about to expire. In another example, the process is triggered if the Original Hosting Entity 1002 intends to obtain statistics about the cached copy stored at the Caching Entity 1006. For example, the Original Hosting Entity 1002 wants to know how frequently the cached copy is retrieved at the Caching Entity 1006.

In step 1 of FIG. 22, the Original Hosting Entity 1002 sends the cache refresh indication to the entity that stores the cached copy. The cache refresh indication contains information as shown in Table 8.

In step 2 of FIG. 22, after receiving the Cache Refresh Indication, the Caching Entity 1006 decides whether it will maintain the cache copy and if so sets the expiration time to the new value.

In step 3 of FIG. 22, the Caching Entity 1006 will send its decision in the Cache Refresh Confirmation as shown in Table 9. If it agrees to maintain the cached copy, it will send its new expiration time. If the Caching Entity 1006 does not want to maintain the cached copy, for example, due to limited resource, it will not set the new expiration time. The Caching Entity 1006 will also include the statistics about the cached resource if it is requested by the Original Hosting Entity 1002.

In step 4 of FIG. 22, the Original Hosting Entity 1002 processes the Cache Refresh Confirmation. If the caching entity 1006 has agreed to keep the cached copy, it sets the new value to the expiration time within the SL Cache registry 1304 associated with the cached copy. Otherwise, it will initiate a cache deletion process.

TABLE 8

Fields in a Cache Refresh Indication

| Fields name | Description |
| --- | --- |
| Expiration Time | The new expiration time of the cached registration at the Original Hosting Entity. |
| Resource Statistics Indication (optional) | Indicate the statistics information to retrieve |
| Resource Content (optional) | The content of the original resource |
| Additional attributes and sub-resource (optional) | Additional attributes and sub-resource that associate with the original resource, for example, access control policy and expiration time. |

TABLE 9

Fields in a Cache Refresh Confirmation

| Fields name | Description |
| --- | --- |
| Cache Decision | The Caching Entity indicates whether it agrees to maintain the cache copy and sets the expiration time to the new value. |
| Cache Expiration Time | The new expiration time of the cached copy at the Caching Entity |
| Resource Retrieval Statistics | The statistics information that the cached resource is retrieved on the Caching Entity. For example, the frequency the cached copy is retrieved by other entities and/or how many times it has been retrieved since the last refresh. |

It is understood that the entities performing the steps illustrated in FIGS. 21 and 22 may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIGS. 21 and 22 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIGS. 21 and 22. It is also understood that the functionality illustrated in FIGS. 21 and 22 may implemented as a set of virtualized network functions. The network functions may not necessarily communicate directly, rather, they may communicate via forwarding or routing function. It is also understood that any transmitting and receiving steps illustrated in FIGS. 21 and 22 may be performed by communication circuitry of the apparatus under control of the processor of the apparatus and the computer-executable instructions (e.g., software) that it executes.

Method to Update a SL Cached Resource

It is desirable to enable the original resource and all cached copies to be synchronized. In particular, if the original resource on the Original Hosting Entity 1002 is changed, all cached copies on Caching Entities 1006 and 1302 should also be updated. Methods to update a SL cached resource are described hereinafter.

Figure 23:
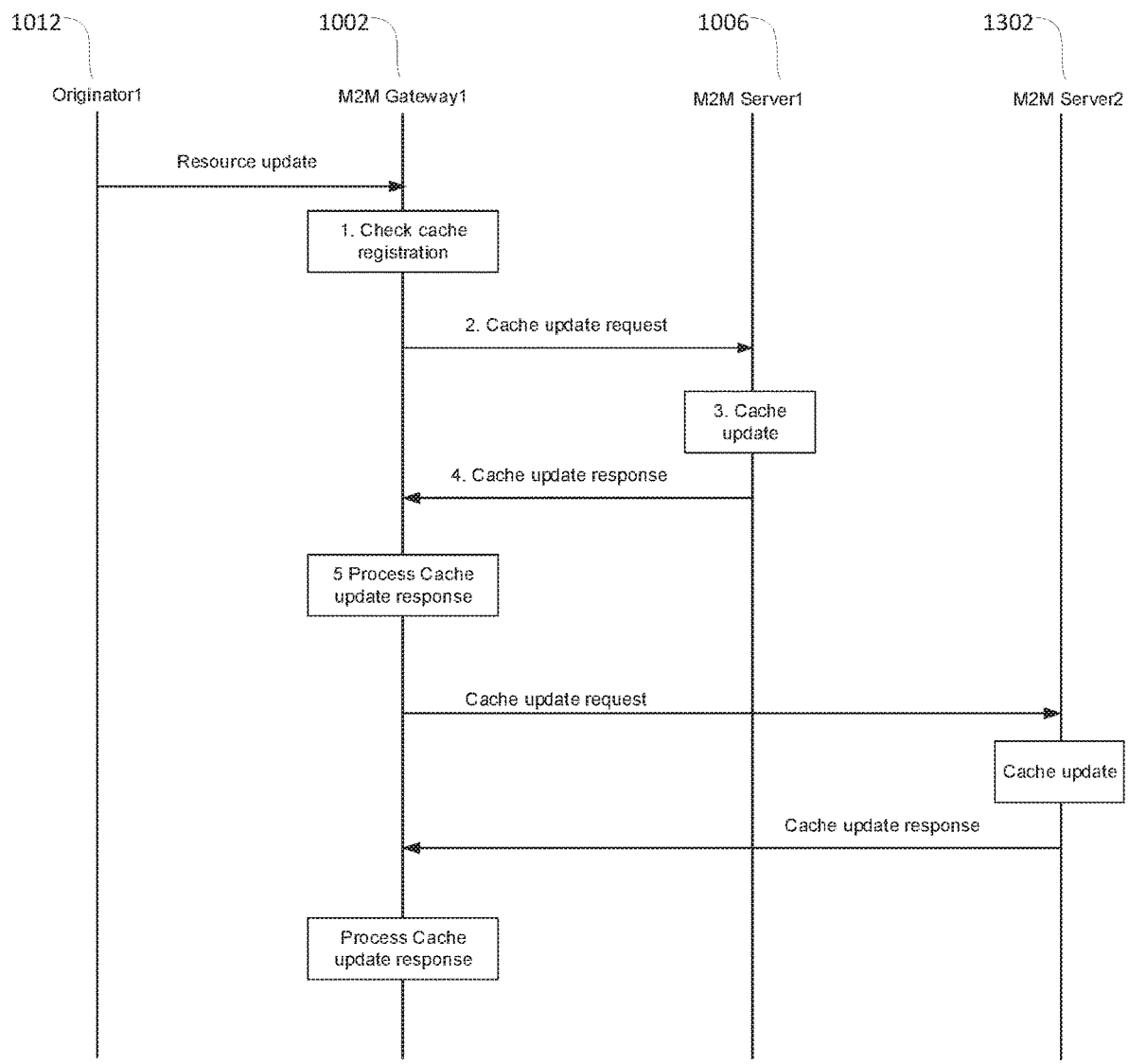
FIG. 23 is a flow chart that illustrates a procedure for an original hosting entity to update all cached copies on caching entities

As illustrated in FIG. 23, if an original resource is changed, the Original Hosting Entity 1002 can initiate a cache update process to update all cached copies stored at one or more Caching Entities 1006 and 1302 as shown in FIG. 23. Note that, the triggering events for the cache refresh method and the cache update method may be different. In particular, a cache refresh is triggered by a timeout and a cache update is triggered by an update of the original resource on the Original Hosting Entity 1002.

In step 1 of FIG. 23, the Original Hosting Entity 1002 checks the SL Cache registry 1304 associated with the resource and obtains a list of Caching Entities 1006 and 1302 that store a cached copy of the resource. Note that an original resource could have an attribute associated with it, which indicates the locations of a cached resource. An attribute could also be a pointer to an entry in the list of cached entities.

In step 2 of FIG. 23, the Original Hosting Entity 1002 sends the cache update request to each Caching Entity 1006 and 1302 in the list. The cache update request contains information as shown in Table 10.

In step 3 of FIG. 23, after receiving the Cache Update Request, the Caching Entity 1006 will update the cached copy based on the information in the request.

In step 4 of FIG. 23, the Caching Entity 1006 will send the result of the update in the Cache Update Response as shown in Table 11. If it set up an expiration time that is different from the value in the request, it will send the new expiration time. The Caching Entity 1006 will also include the statistics about the cached resource if it is requested by the Original Hosting Entity 1002.

In step 5 of FIG. 23, the Original Hosting Entity 1002 processes the Cache Update Response. It sets the new value to the expiration time within the SL Cache registry 1304 associated with the cached copy, if the caching entity proposes new expiration time. The Original Hosting Entity 1002 can initiate a cache deletion process, if the Caching Entity 1302 fails to update the cached copy.

TABLE 10

Fields in a Cache Update Request

| Fields name | Description |
| --- | --- |
| Resource Content | The content of the original resource |
| Expiration Time (optional) | The new expiration time of the cached registration at the original resource hosting entity |
| Resource Statistics Indication (optional) | Indicate to report statistics information associated with the cached copy |

TABLE 10-continued

Fields in a Cache Update Request

| Fields name | Description |
| --- | --- |
| Additional attributes and sub-resource (optional) | Additional attributes and sub-resource that associate with the original resource, for example, access control policy and expiration time. |

TABLE 11

Fields in a Cache Update Response

| Fields name | Description |
| --- | --- |
| Cache Decision | The Caching Entity responds whether the cached copy is updated. |
| Expiration Time (optional) | The expiration time of the cached copy at the Caching Entity |
| Resource Retrieval Statistics (optional) | The statistics information that the cached resource is retrieved on the Caching Entity. For example, the frequency the cached copy is retrieved by other entities and/or how many times it has been retrieved since the last refresh. |

It is understood that the entities performing the steps illustrated in FIG. 23 may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIG. 23 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIG. 23. It is also understood that the functionality illustrated in FIG. 23 may implemented as a set of virtualized network functions. The network functions may not necessarily communicate directly, rather, they may communicate via forwarding or routing function. It is also understood that any transmitting and receiving steps illustrated in FIG. 23 may be performed by communication circuitry of the apparatus under control of the processor of the apparatus and the computer-executable instructions (e.g., software) that it executes.

Method to Delete a SL Cached Resource

Either the Original Hosting Entity 1002 or the Caching Entity 1006 or 1302 can initiate a cache deletion process to delete a copy of cached cache. Two methods are described herein to delete a cached resource in a Caching Entity 1006 or 1302.

Cache Deletion Method Initiated by a Caching Entity

Figure 24:
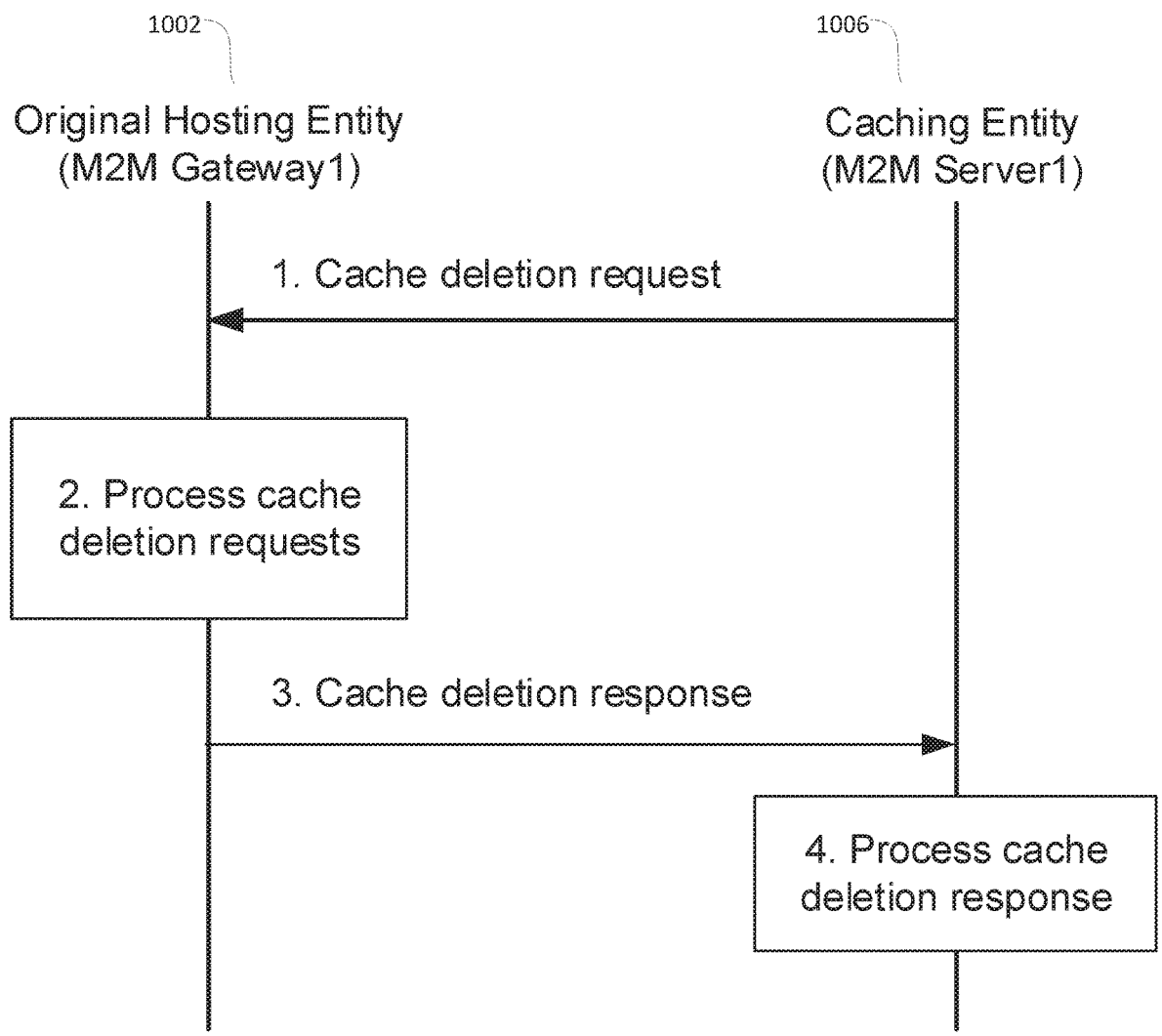
FIG. 24 is a flow chart that illustrates a cache deletion process initiated by a caching entity

FIG. 24 illustrates a method for cache deletion initiated by a Caching Entity 1006. The Caching Entity 1006 may initiate the cache deletion process in many scenarios. For example, the process can be triggered when the Caching Entity 1006 does not have enough space to cache the resource. In another example, the process can be triggered when the Caching Entity 1006 fails to refresh the cached copy. In yet another example, the Caching Entity 1006 may decide to delete the entry if it has not been accessed for some time. The detailed descriptions for the cache deletion process are as follows.

In step 1 of FIG. 24, the Caching Entity 1006 sends the Cache deletion request to the Original Hosting Entity 1002. The Caching Entity 1006 may include the reason of the cache deletion and the statistics about how often the cached copy is accessed in the request (See Table 12). There are several reasons that the Caching Entity 1006 requests to delete the cached copy. In one example, the cached copy has not been retrieved for a long time period. In another example, the Caching Entity 1006 lacks available resources to continue caching.

In step 2 of FIG. 24, the Original Hosting Entity 1002 processes the cache deletion request and may decide whether to grant the deletion request based on the reason in the request. For example, the Original Hosting Entity 1002 may reject the request if the reason in the deletion request is low retrieval frequency. In another example, the Original Hosting Entity 1002 may grant the deletion request if the reason in the deletion request is the Caching Entity lacks of resource. The Original Hosting Entity 1002 removes the entry in the cache registry 1304 associated with the cached copy if it grants the cache deletion request In step 3 of FIG. 24, the Original Hosting Entity 1002 sends a cache deletion response to the Caching Entity 1006.

In step 4 of FIG. 24, the Caching Entity 1006 removes the cached resource after receiving the deletion response that grants the deletion request.

TABLE 12

Fields in a Cache Deletion Request

| Fields name | Description |
| --- | --- |
| OriginalResourceURI | The URI of the original resource |
| CachedResourceURI | The URI where the Caching Entity caches the resource |
| Reason (optional) | Indicate the reason the cached copy is deleted. There are several reasons that the Caching Entity requests to delete the cached copy. In one example, the cached copy has not been retrieved for a long time period. In another example, the Caching Entity lacks proper resources to continue caching. |
| Statistics (optional) | The statistics about how often or how many times the cached copy is accessed |

Cache Deletion Method Initiated by an Original Hosting Entity

Figure 25:
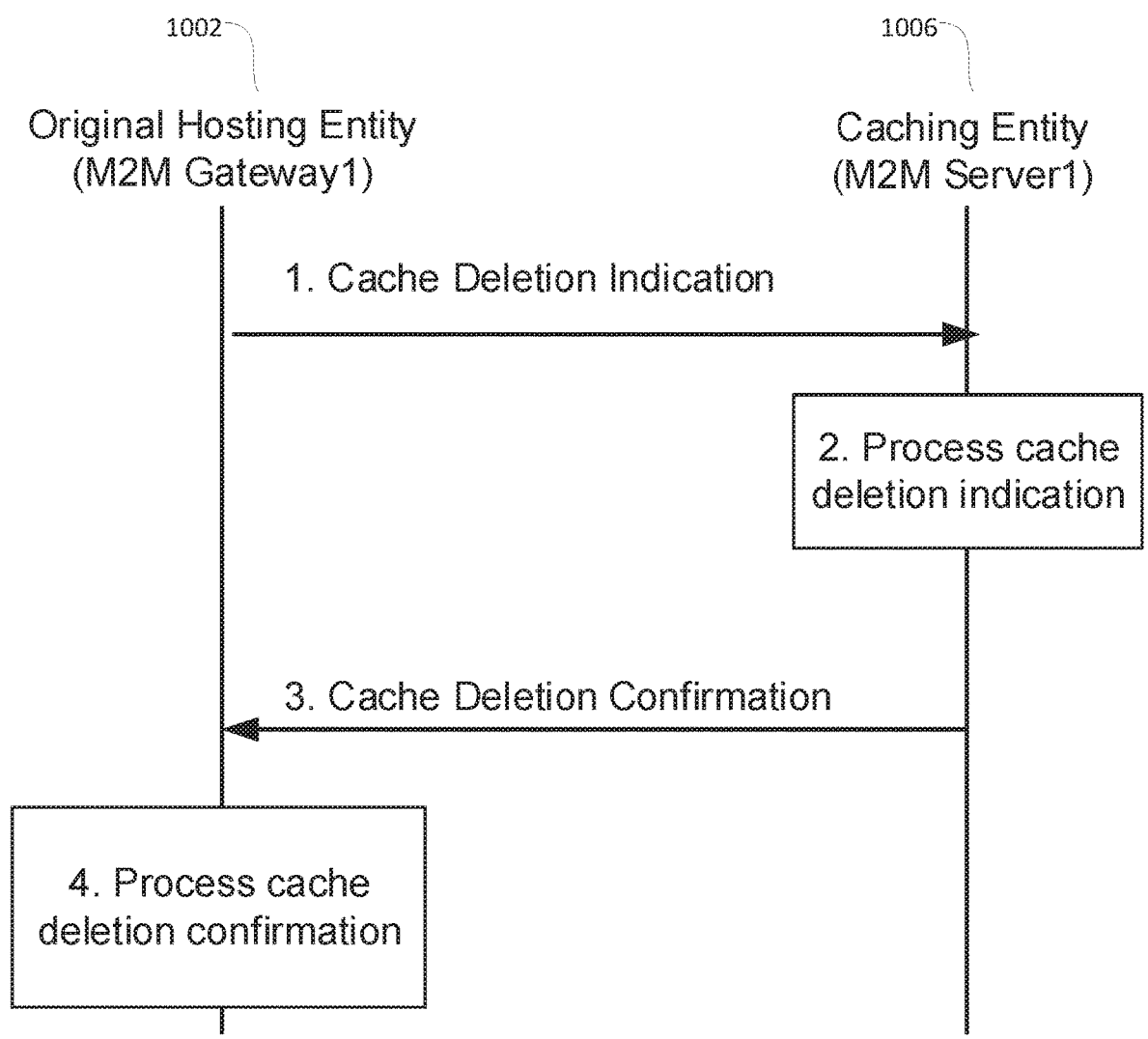
FIG. 25 is a flow chart that illustrates a cache deletion process initiated by an Original Hosting Entity
Figure 26:
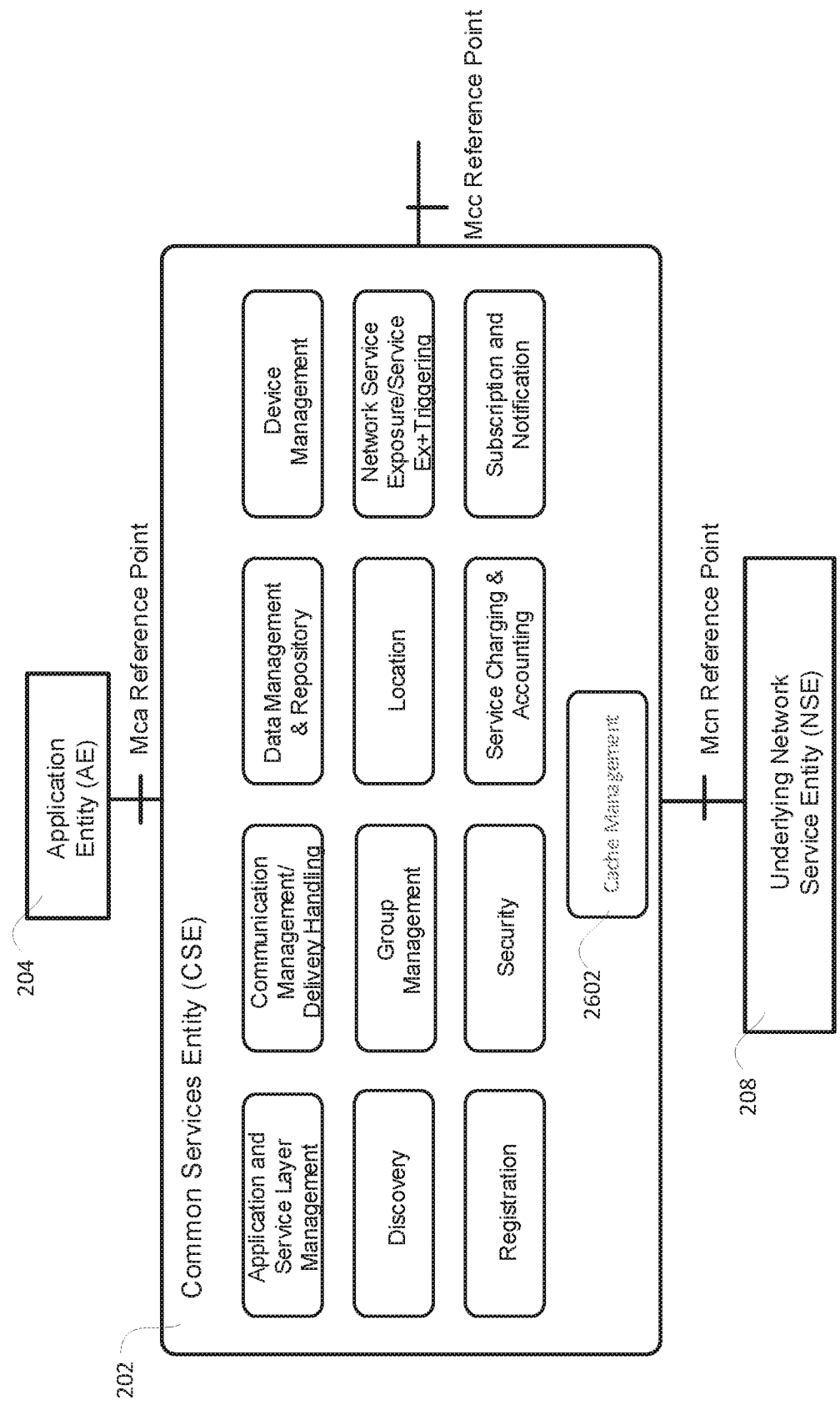
FIG. 26 is a diagram that illustrates a one M2M cache management CSF Embodiment

The Original Hosting Entity 1002 may also initiate the cache deletion process as shown in FIG. 25 in many scenarios. For example, the process can be triggered when the original resource is removed by the originator. In another example, the process can be triggered when the Original Hosting Entity 1002 fails to refresh the cached copy. In another example, the Original Hosting Entity 1002 may decide, based on statistics about the number of times a cached copy is accessed, that the cached copy should be deleted. In yet another example, a change in access rights of the original resource may cause the Original Hosting Entity 1002 to decide to delete the cached copy. The detail descriptions for the cache deletion process are as follows.

In step 1 of FIG. 25, the Original Hosting Entity 1002 sends the Cache deletion indication to the Caching Entity 1006. The Original Hosting Entity 1002 may include the reason of the cache deletion in the indication message.

In step 2 of FIG. 25, the Caching Entity 1006 removes the cached copy include all associated attributed and sub-resource.

In step 3 of FIG. 25, the Caching Entity 1006 sends a Cache Deletion Confirmation message to the Original Hosting Entity 1002. The Caching Entity 1006 may include the statistics about how often and how many times the cached copy is accessed in the Cache Deletion Confirmation message (See Table 13).

In step 4 of FIG. 25, the Original Hosting Entity 1002 removes the cache registry 1304 associated with the cached copy after receiving the Cache Deletion Confirmation message.

TABLE 13

Fields in a Cache Deletion Confirmation

| Fields name | Description |
| --- | --- |
| OriginalResourceURI | The URI of the original resource |
| CachedResourceURI | The URI where the Caching Entity caches the resource |
| Statistics (optional) | The statistics about how often or how many times the cached copy is accessed |

It is understood that the entities performing the steps illustrated in FIGS. 24 and 25 may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIGS. 24 and 25 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIGS. 24 and 25. It is also understood that the functionality illustrated in FIGS. 24 and 25 may implemented as a set of virtualized network functions. The network functions may not necessarily communicate directly, rather, they may communicate via forwarding or routing function. It is also understood that any transmitting and receiving steps illustrated in FIGS. 24 and 25 may be performed by communication circuitry of the apparatus under control of the processor of the apparatus and the computer-executable instructions (e.g., software) that it executes.

oneM2M defines the capabilities supported by the oneM2M Service Layer. The oneM2M Service Layer is instantiated as a Capability Services Entity (CSE) 202 which. CSEs may communicate with the Cache Management CSF 2602 via the Mcc and Mcc' reference point to create and manage cache copies.

New Common Attributes

Table 14 describes a number of new attributes that may be added to the existing one M2M common resource, or to one of the other base resource types, or even to a new base type "cachableResource".

TABLE 14

New Attributes of a Common Resource

| Attribute Name | Description |
| --- | --- |
| Cacheability | This attribute indicates whether a resource can be cached by other entities. The attribute has two values, one is Cacheable and the other one is non-Cacheable. This attribute can be configured by the resource owner/originator or by the hosting CSE. |

TABLE 14-continued

New Attributes of a Common Resource

| Attribute Name | Description |
|---|---|
| cacheLocation | This attribute is a list that stores to descriptions, e.g. URI, of where the resource is cached. |

New Parameters for accessControlOperations

Table 15 describes a new supported operation that may be authorized by accessControlOperations.

TABLE 15

New Types of parameters in accessControlOperations

| Name | Description |
|---|---|
| CACHE | Privilege to create a cache copy of the resource |

New Request Message Format

The existing Request message may be enhanced with several new parameters for supporting cache management. As shown in Table 15, requests over the Mcc and Mcc' reference points, from an Originator to a Receiver, may contain the new parameters as an optional parameter.

TABLE 16

New Parameter in Request Message

| Request message parameter | Create | Retrieve | Update | Delete | Notify |
|---|---|---|---|---|---|
| OriginalResourceURI | O | O | O | O | O |
| CachedResourceURI | O | O | O | O | O |
| Content Retrieve Flag | O | O | O | O | O |
| Cache Expiration Time | O | O | O | O | O |
| Access control privileges | O | O | O | O | O |
| Resource Retrieval Statistics | O | O | O | O | O |
| Resource Statistics Indication | O | O | O | O | O |
| Cache Deletion Reason | O | O | O | O | O |

New Response Message Format

The existing response message may be enhanced with several new parameters for supporting cache management. As shown in Table 17, responses over the Mcc and Mcc' reference points, from a Receiver to an Originator will contain the new parameters as an optional parameter.

New Resources

Several new resources may be defined to support the service layer cache management methods described herein.

<cacheRegistry> Resource

Figure 27:
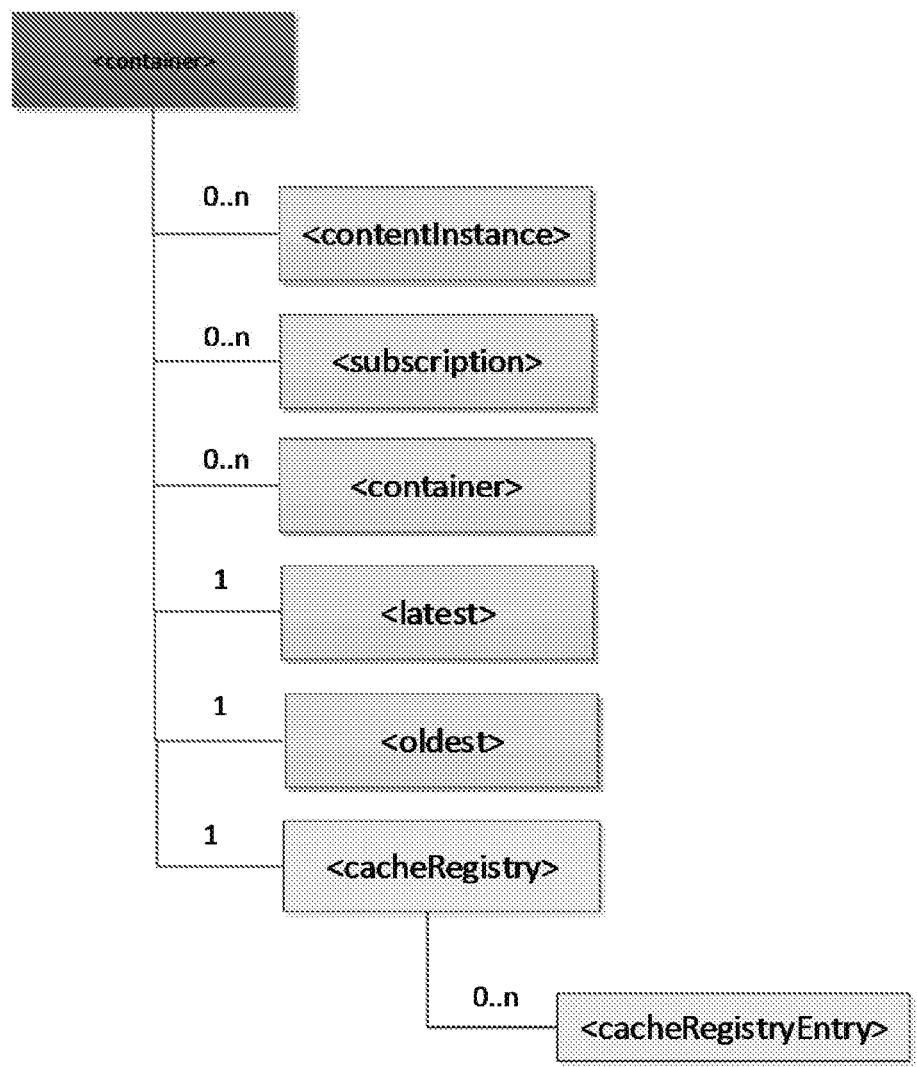
FIG. 27 is a diagram that illustrates a <cacheRegistry> resource

The <cacheRegistry> resource may store the information to manage a cached resource under a resource, e.g. <container>, as shown in FIG. 27 in the original resource hosting CSE. It has a child resource <cacheRegistryEntry>. The cache registry information can also be kept in attributes associated with the individual resources that are cached.

<cacheRegistryEntry> Resource

Figure 28:
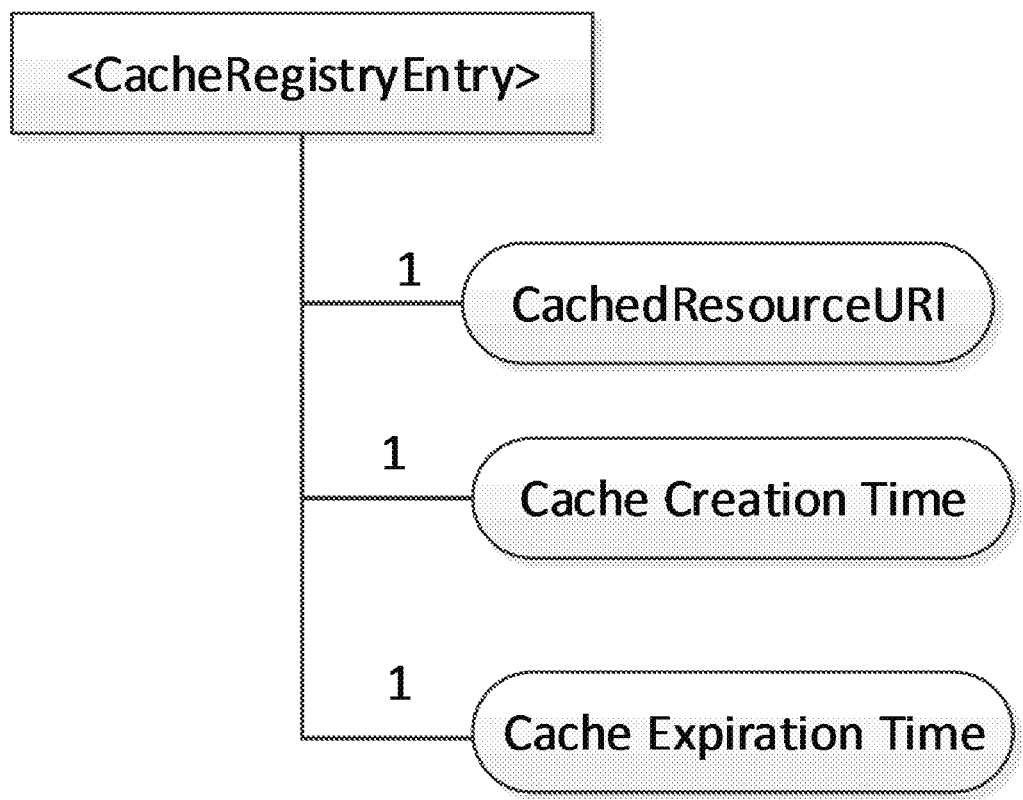
FIG. 28 is a diagram that illustrates a <cacheRegistrationEntry> resource

FIG. 28 shows one embodiment of the child resource <cacheRegistryEntry>. Table 18 shows the new attributes of the <cacheRegistryEntry> child resource in addition to the universal and common attributes defined in oneM2M.

TABLE 18

Attribute of < CacheRegistrationEntry >

| Attributes of <CacheRegistryEntry> | Multi-plicity | RW/RO/WO | Description |
|---|---|---|---|
| CachedResourceURI | 1 | RW | The URI the of the cached resource hosted on a SL caching entity |
| Cache Creation Time | 1 | RW | The time at which the cached copy of the resource was created. This information can be used by a Original Hosting Entity to determine if a cached copy is up to date with the last modified version of the original resource. |
| Cache Expiration Time | 1 | RW | The time that the cached SL resource shall expire and be deleted |

<cacheTable> Resource

Figure 29:
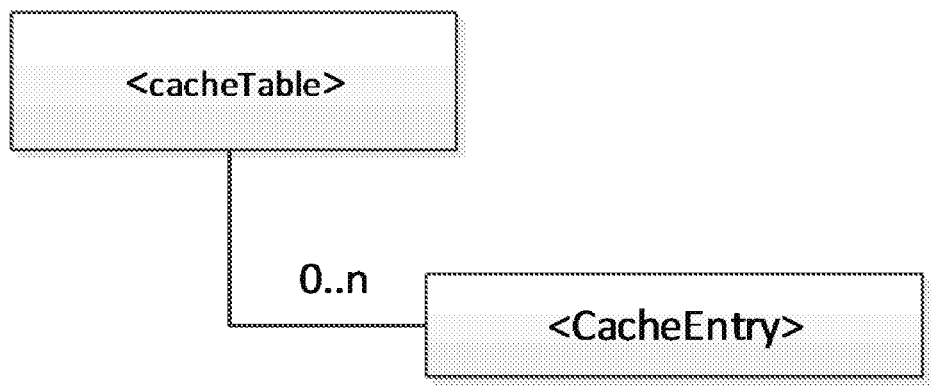
FIG. 29 is a diagram that illustrates a <cacheTable> resource
Figure 30:
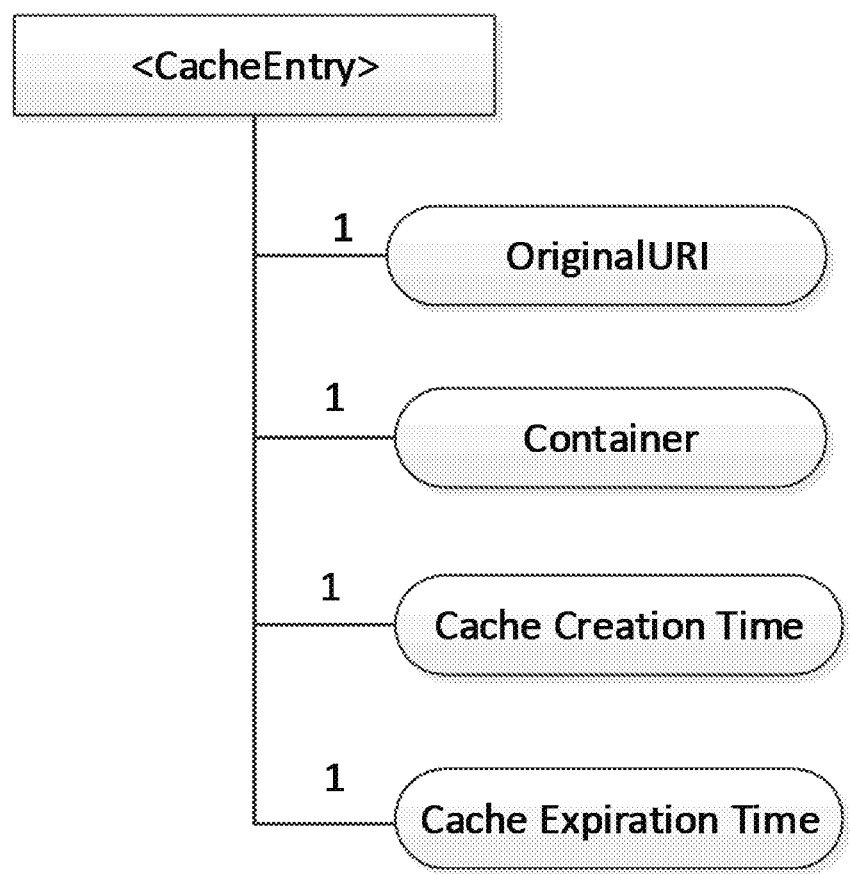
FIG. 30 is a diagram that illustrates a <cacheEntry> resource

One embodiment of a <cacheTable> resource is shown in FIG. 29. It may store information to manage a cached resource at the CSEBase in the Caching CSE. It has a child resource <cacheEntry>, illustrated in FIG. 30. Table 19 lists the attributes of the <CacheEntry> resource in accordance with one embodiment.

TABLE 17

New Parameter in Response Message

| | | success or not | | | | | |
|---|---|---|---|---|---|---|---|
| Response message parameter | Response Code = Ack | Response Code = successful Operation = Create | Response Code = successful Operation = Retrieve | Response Code = successful Operation = Update | Response Code = successful Operation = Delete | Response Code = successful Operation = Notify | Response Code = unsuccessful Operation = C, R, U, D or N |
| OriginalResourceURI | O | O | O | O | O | O | O |
| CachedResourceURI | O | O | O | O | O | O | O |
| Cache Creation Decision | O | O | O | O | O | O | O |
| Content Retrieve Flag | O | O | O | O | O | O | O |
| Cache Expiration Time | O | O | O | O | O | O | O |
| Resource Retrieval Statistics | O | O | O | O | O | O | O |
| Cache Deletion Reason | O | O | O | O | O | O | O |

TABLE 19

Attributes of < CacheEntry >

| Attributes of <CacheEntry> | Multi-plicity | RW/RO/WO | Description |
|---|---|---|---|
| OriginalURI | 1 | RW | The URI the of the cached resource hosted on a SL caching entity |
| Container | 1 | RO | The cached copy of the container resource |
| Cache Creation Time | 1 | RW | The time at which the cached copy of the resource was created. This information can be used by a Original Hosting Entity to determine if a cached copy is up to date with the last modified version of the original resource. |
| Cache Expiration Time | 1 | RW | The time that the cached SL resource shall expire and be deleted | oneM2M Procedure Enhancements

Figure 31:
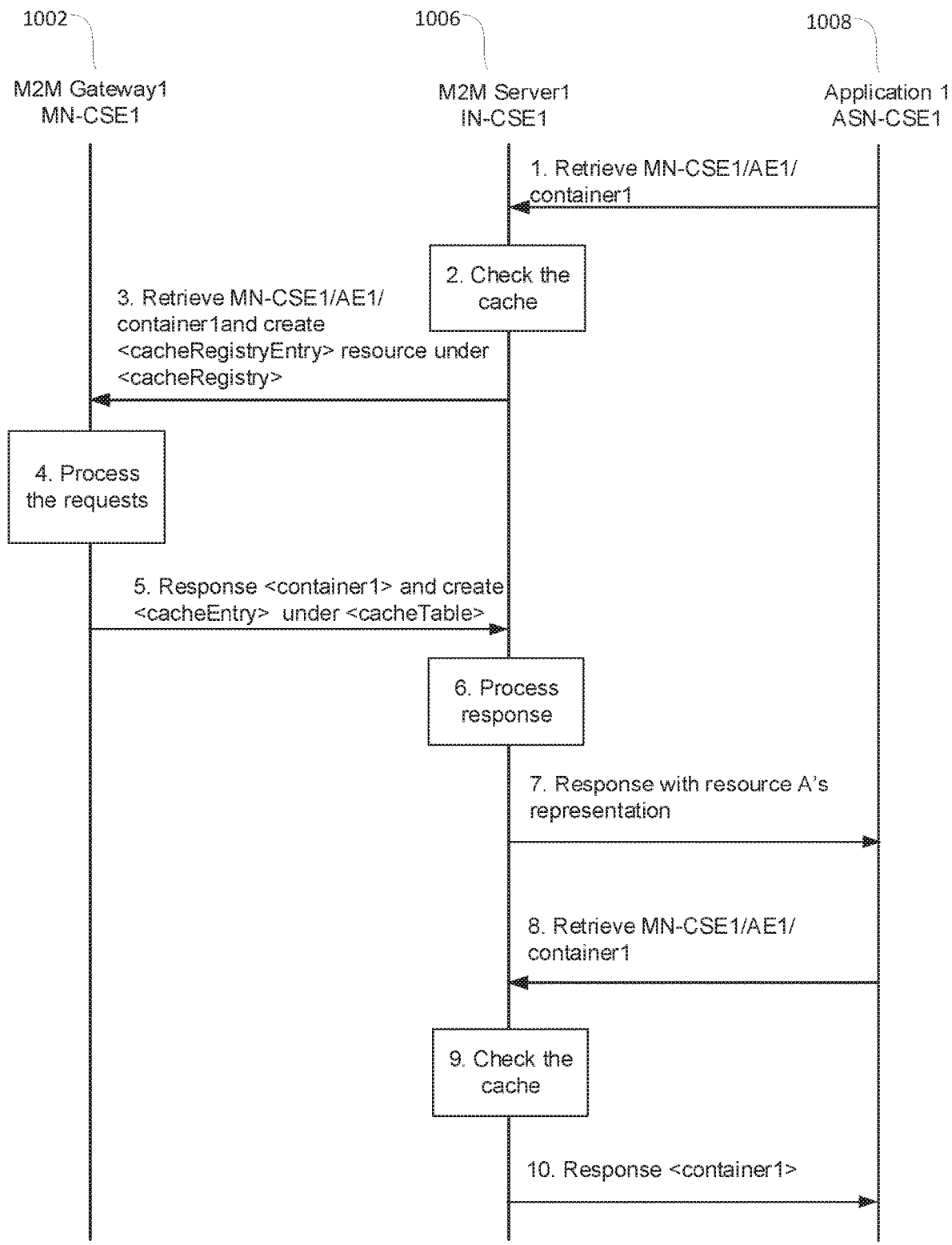
FIG. 31 is a flow chart that illustrates an M2M server creates a cached copy when a client retrieves the resource on an M2M gateway.

To realize the mechanisms and procedures described in this disclosure, oneM2M procedures may be enhanced. FIG. 31 illustrates one embodiment of a method initiated by a Caching Entity 1006 for creating a SL cached resource. An Entity 1006, e.g. a M2M server may initiate this process as follows if or when it receives a request from an Application 1008, which requests to retrieve a resource from a M2M Gateway 1002.

In step 1 of FIG. 31, the Application CSE sends a retrieve request to the M2M Server CSE to retrieve container1 on the M2M Gateway CSE. The retrieve request contains the URI (MN-CSE1/AE1/Container1).

In step 2 of FIG. 31, the M2M Server CSE will look at it <CacheTable> and do not find a cached copy of the contained requested.

In step 3 of FIG. 31, the M2M Server CSE sends a message to the M2M Gateway 1002 to retrieve container1 on the M2M Gateway CSE. The message contains a retrieve request for the resource at URI:MN-CSE1/AE1/Container1. If the M2M Server CSE intends to create a cached copy of the container1, the message also contains a request to create a new <CacheRegistryEntry> under <CacheRegistry> of Container1 on M2M Gateway 1002. The M2M Server 1006 has to indicate the URI where the cached resource, e.g. IN-CSE/CacheTable/CacheEntry1 in the message.

In step 4 of FIG. 31, the M2M Gateway 1002 creates a new <CacheRegistryEntry> under <CacheRegistry> of Container1 if the resource is cacheable and the M2M server 1006 has the authorized to cached the resource.

In step 5 of FIG. 31, the M2M Gateway 1002 sends a message that includes the resource representation of Contain1 and a request to create a new resource <CacheEntry> under IN-CSE1/CacheTable.

In step 6 of FIG. 31, the M2M Server 1006 creates a new <CacheEntry> under IN-CSE1/CacheTable based on the information in the response, e.g. the URI of the original resource.

In step 7 of FIG. 31, the M2M Server 1002 send the response to the Application CSE about the <constanstinstance> of the Container1.

In step 8 of FIG. 31, the Application CSE sends a retrieve request to the M2M Server CSE to retrieve container1 on the M2M Gateway CSE. The retrieve request contains the URI (MN-CSE1/AE1/Container1).

In step 9 of FIG. 31, the M2M Server CSE will look at it <CacheTable> and find a cached copy of the contained requested based the OriginalResourceURI attribute.

In step 10 of FIG. 31, the M2M Server 1006 sends the response to the Application CSE about the <constanstinstance> of the Container1.

It is understood that the entities performing the steps illustrated in FIG. 31 may be logical entities that may be implemented in the form of software (i.e., computer-executable instructions) stored in a memory of, and executing on a processor of, an apparatus configured for wireless and/or network communications or a computer system such as those illustrated in FIG. 33C or FIG. 33D. That is, the method(s) illustrated in FIG. 31 may be implemented in the form of software (i.e., computer-executable instructions) stored in a memory of an apparatus, such as the apparatus or computer system illustrated in FIG. 33C or FIG. 33D, which computer executable instructions, when executed by a processor of the apparatus, perform the steps illustrated in FIG. 31. It is also understood that the functionality illustrated in FIG. 31 may implemented as a set of virtualized network functions. The network functions may not necessarily communicate directly, rather, they may communicate via forwarding or routing function. It is also understood that any transmitting and receiving steps illustrated in FIG. 31 may be performed by communication circuitry of the apparatus under control of the processor of the apparatus and the computer-executable instructions (e.g., software) that it executes.

Figure 32A:
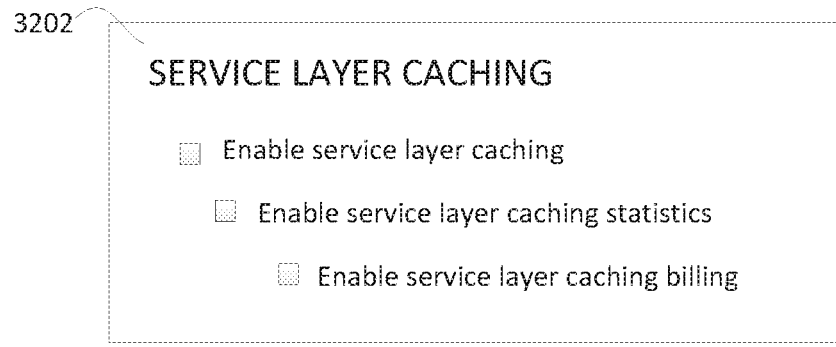
FIGS. 32A and 32B are diagrams of Graphical User Interfaces.
Figure 32B:
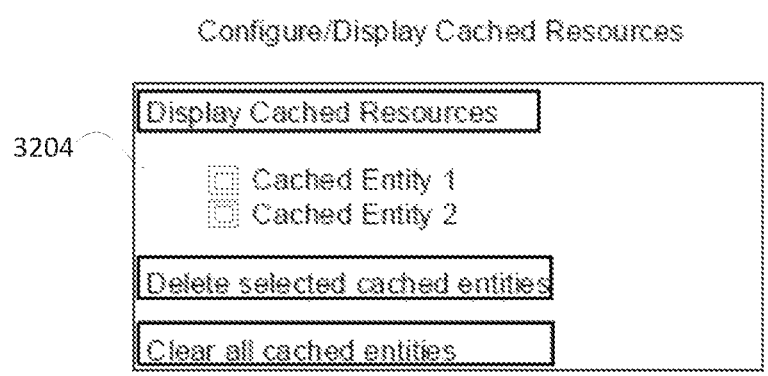

Interfaces, such as Graphical User Interfaces (GUIs), can be used to assist a user to control and/or configure functionalities related to service layer cache management. FIG. 32A is a diagram that illustrates one embodiment of a graphical user interface 3202 that allows a user to enable/disable service layer caching, service layer caching statistics and service layer caching billing. FIG. 32B illustrates an embodiment of a user interface 3204 for a SL entity (e.g. an oneM2M CSE) to configure and/or display cached resources. It is to be understood that interfaces 3202 and 3204 can be produced and presented using displays such as those shown in FIGS. 33C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., one M2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 33A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204.

As shown in FIG. 33A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 33A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 33B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204. The M2M service layer 22 may be implemented by one or more servers, computers, devices, virtual machines (e.g. cloud/storage farms, etc.) or the like, including for example the devices illustrated in FIGS. 33C and 33D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 33B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204 may be hosted within a M2M service layer instance hosted by an M2M node, such as an M2M server, M2M gateway, or M2M device, as shown in FIG. 33B. For example, the logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 33C or FIG. 33D described below.

Further, logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204 can implemented as part of an M2M network that uses a Service Oriented Architecture (SOA) and/or a Resource-Oriented Architecture (ROA) to access services of the present application.

FIG. 33C is a block diagram of an example hardware/software architecture of a M2M network node 30, such as an M2M device 18, an M2M gateway 14, an M2M server, or the like. The node 30 can execute or include logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204. The device 30 can be part of an M2M network as shown in FIG. 33A-B or part of a non-M2M network. As shown in FIG. 33C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 33C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 33C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 33C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 33D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 33A and FIG. 33B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 33A-B or the device 30 of FIG. 33C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as sensors 1012, M2M gateway (original resource entity) 1002, M2M server (caching entity) 1006 and 1302, applications 1008 and 1010, cache registry 1304, cache management CSF 2602 and logical entities to create interfaces such as interfaces 3202 and 3204 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method of managing cached resource data of a machine-to-machine service layer by an original hosting entity, the method comprising:
- instructing, by the original hosting entity, a caching entity to collect statistical information of a use of a cached service layer resource data at a location, wherein the statistical information comprises frequency of retrieval and cache expiration time;
- sending, by the original hosting entity to the caching entity, a message to manage the cached service layer resource data to a location to be cached in the caching entity;
- receiving, by the original hosting entity from the caching entity, confirmation of managing the cached service layer resource data, wherein the confirmation comprises statistical information of the use of the cached service layer resource data;
- storing, by the original hosting entity, information related to the cached service layer resource data in a service layer cache registry;
- based on the information, providing instructions, by the original hosting entity, to further manage the cached service layer resource data; and
- using, by the original hosting entity, the service layer cache registry to manage the cached service layer resource data in the caching entity, wherein the management includes an operation with respect to the cached service layer resource data, wherein the operation is initiated by the original hosting entity.

2. The method of claim 1, wherein the original hosting entity is a machine-to-machine gateway and the caching entity is a machine-to-machine server.

3. The method of claim 1, wherein the caching entity initiates a refresh operation to refresh the cached service layer resource data.

4. The method of claim 1, wherein the original hosting entity initiates a refresh operation to refresh the cached service layer resource data.

5. The method of claim 1, wherein the machine-to-machine service layer comprises a service supporting capabilities through set of application programming interfaces (APIs).

6. The method of claim 1, wherein the information related to the cached service layer resource data further comprises access control policy for attributes or sub-resources.

7. An apparatus comprising a processor and a memory, the memory storing computer-executable instructions which, when executed by the processor of the apparatus, cause the apparatus to:
- instruct, by an original hosting entity, a caching entity to collect statistical information of a use of a cached service layer resource data at a location, wherein the statistical information comprises frequency of retrieval and cache expiration time;
- send, by the original hosting entity, to the caching entity, a message to manage cached service layer resource data to a location to be cached in the caching entity;
- receive, by the original hosting entity from the caching entity, confirmation of managing the cached service layer resource data, wherein the confirmation comprises statistical information of the use of the cached service layer resource data;
- store, by the original hosting entity, information related to the cached service layer resource data in a service layer cache registry, wherein the information related to the cached service layer resource data further comprises access control policy for attributes or sub-resource; and
- based on the information, provide instructions, by the original hosting entity, to further manage the cached service layer resource data.

8. The apparatus of claim 7, the operations further comprising using, by the original hosting entity, the service layer cache registry to manage the cached service layer resource data in the caching entity, wherein the management includes an operation with respect to the cached service layer resource data, wherein the operation is a refresh operation.

9. The apparatus of claim 7, the operations further comprising using, by the original hosting entity, the service layer cache registry to manage the cached service layer resource data in the caching entity, wherein the management includes an operation with respect to the cached service layer resource data, wherein the operation is an update operation.

10. The apparatus of claim 7, the operations further comprising using, by the original hosting entity, the service layer cache registry to manage the cached service layer resource data in the caching entity, wherein the management includes an operation with respect to the cached service layer resource data, wherein the operation is a delete operation.

11. The apparatus of claim 10, the operations further comprising using, by the original hosting entity, the service layer cache registry to manage the cached service layer resource data in the caching entity, wherein the management includes an operation with respect to the cached service layer resource data, wherein the operation is initiated by a request sent from the location.

12. The apparatus of claim 7, wherein the layer comprises a service supporting capabilities through set of application programming interfaces (APIs).

* * * * *